US012464602B2

(12) United States Patent
Moustafa et al.

(10) Patent No.: US 12,464,602 B2
(45) Date of Patent: Nov. 4, 2025

(54) METHODS, SYSTEMS, ARTICLES OF MANUFACTURE AND APPARATUS TO IMPROVE MOBILE EDGE PLATFORM RESILIENCY

(71) Applicant: Intel Corporation, Santa Clara, CA (US)

(72) Inventors: Hassnaa Moustafa, San Jose, CA (US); Francesc Guim Bernat, Barcelona (ES); Kannan Babu Ramia, Bangalore (IN); Christian Maciocco, Portland, OR (US); Kshitij Arun Doshi, Tempe, AZ (US); Nageen Himayat, Fremont, CA (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 17/556,728

(22) Filed: Dec. 20, 2021

(65) Prior Publication Data
US 2022/0117036 A1 Apr. 14, 2022

(51) Int. Cl.
*H04W 84/18* (2009.01)
*H04W 12/06* (2021.01)
(Continued)

(52) U.S. Cl.
CPC ........... *H04W 84/18* (2013.01); *H04W 12/06* (2013.01); *H04W 12/08* (2013.01); *H04W 24/04* (2013.01); *H04W 76/10* (2018.02); *H04W 88/08* (2013.01)

(58) Field of Classification Search
CPC ..... H04W 84/18; H04W 12/06; H04W 12/08; H04W 24/04; H04W 76/10; H04W 88/08; H04W 12/61; H04L 63/0869
See application file for complete search history.

(56) References Cited

U.S. PATENT DOCUMENTS

| 2002/0124169 A1* | 9/2002 | Agrawal | ................. H04L 63/08 380/278 |
| 2010/0046426 A1* | 2/2010 | Shenoy | ................... H04L 67/12 370/328 |

(Continued)

OTHER PUBLICATIONS

Tzur-David, S., "What is Zero Trust Authentication?", May 16, 2018, https://doubleoctopus.com/blog/general/what-is-zero-trust-authentication/#:~:text=Zero%20Trust%20technology%20means%20that,each%20door%20within%20the%20building., 11 pages.

(Continued)

*Primary Examiner* — Candal Elpenord
*Assistant Examiner* — Patrick Yipao Pei
(74) *Attorney, Agent, or Firm* — HANLEY, FLIGHT & ZIMMERMAN, LLC

(57) ABSTRACT

Methods, apparatus, systems, and articles of manufacture are disclosed to improve mobile edge platform resiliency. An example apparatus includes memory, instructions, and processor circuitry to execute the instructions to initiate a search for one of an access point or a cluster head at a first time, in response to detection of the cluster head, initiate an intra-cluster mobile edge platform (MEP) mutual authentication associated with the cluster head, cause transmission of historical activity data to at least one MEP associated with the cluster head, and cause storage of an authentication metric in a secure storage, the authentication metric based on historical connectivity data.

27 Claims, 19 Drawing Sheets

(51) Int. Cl.
    *H04W 12/08*     (2021.01)
    *H04W 24/04*     (2009.01)
    *H04W 76/10*     (2018.01)
    *H04W 88/08*     (2009.01)

(56) References Cited

U.S. PATENT DOCUMENTS

| | | |
|---|---|---|
| 2016/0286476 A1* | 9/2016 | Patil .................. H04W 40/32 |
| 2018/0183855 A1 | 6/2018 | Sabella et al. |
| 2020/0007414 A1* | 1/2020 | Smith .................. H04L 67/12 |
| 2020/0127980 A1* | 4/2020 | Smith .................. H04L 63/20 |
| 2020/0167205 A1* | 5/2020 | Guim Bernat .......... H04L 49/70 |
| 2021/0144517 A1 | 5/2021 | Guim Bernat et al. |
| 2022/0167409 A1* | 5/2022 | Oteri ................ H04W 74/0816 |

OTHER PUBLICATIONS

Ranaweera, P., et al., "Survey on Multi-Access Edge Computing Security and Privacy," IEEE Communications Surveys & Tutorials, vol. 23, Issue 2. Published Feb. 26, 2021, 49 pages.

European Patent Office, "Extended European Search Report," issued in connection with European Application No. 22202671, dated Oct. 5, 2023, 9 pages.

* cited by examiner

METHODS, SYSTEMS, ARTICLES OF MANUFACTURE AND APPARATUS TO IMPROVE MOBILE EDGE PLATFORM RESILIENCY

FIELD OF THE DISCLOSURE

This disclosure relates generally to network performance and, more particularly, to methods, systems, articles of manufacture and apparatus to improve mobile edge platform resiliency.

BACKGROUND

In recent years, network demands have increased substantially. Expectation that networks are available has led to a degree of reliance by the users of such networks. Increasingly, emergency services, medical services and business commerce have relied upon networks to remain active and capable of handling networking communications without substantial and/or prolonged delay.

The figures are not to scale. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Figure 1:
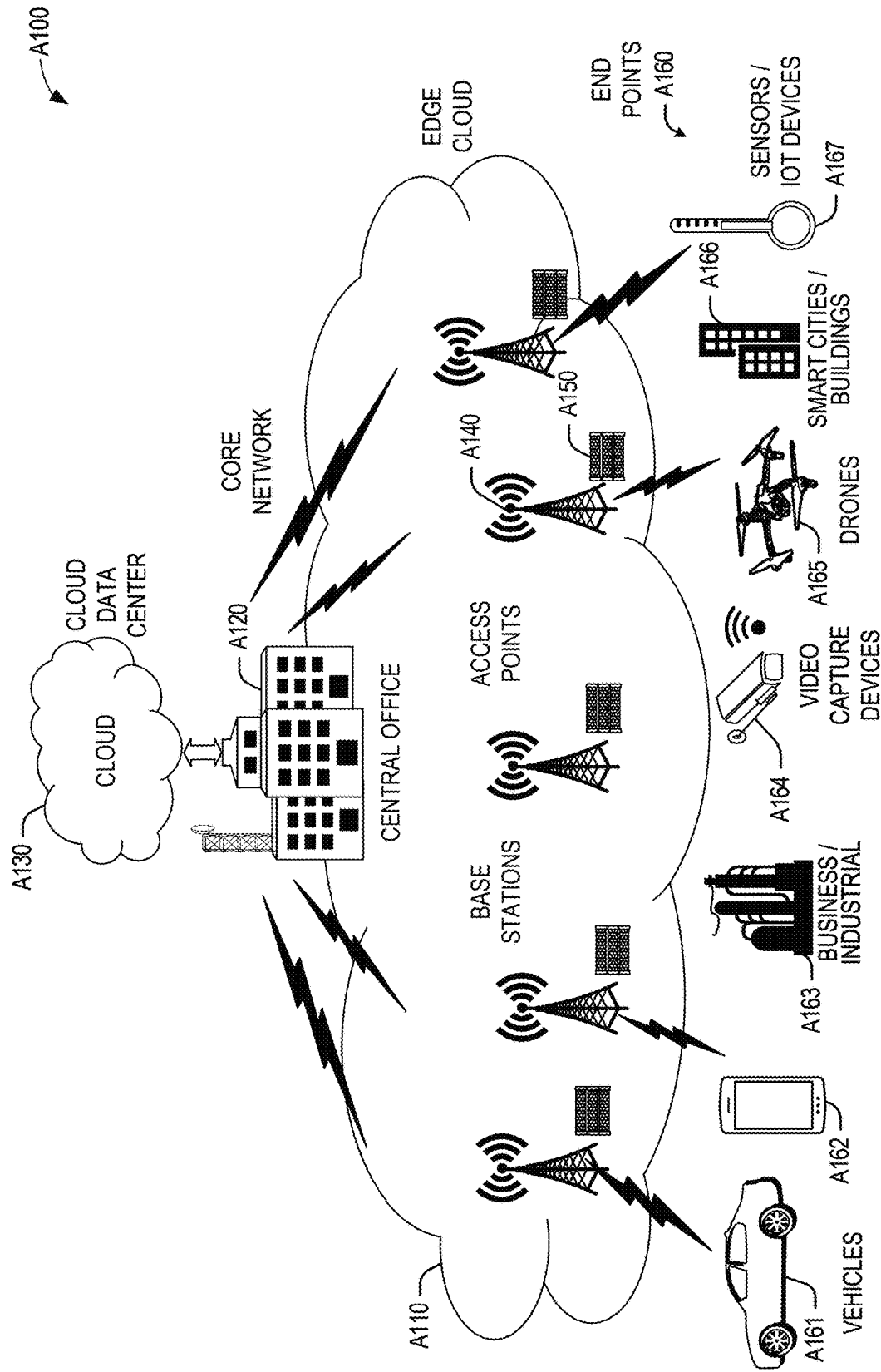
FIG. 1 illustrates an overview of an Edge cloud configuration for Edge computing.

FIG. 1 is a block diagram A100 showing an overview of a configuration for Edge computing, which includes a layer of processing referred to in many of the following examples as an "Edge cloud". As shown, the Edge cloud A110 is co-located at an Edge location, such as an access point or base station A140, a local processing hub A150, or a central office A120, and thus may include multiple entities, devices, and equipment instances. The Edge cloud A110 is located much closer to the endpoint (consumer and producer) data sources A160 (e.g., autonomous vehicles A161, user equipment A162, business and industrial equipment A163, video capture devices A164, drones A165, smart cities and building devices A166, sensors and IoT devices A167, etc.) than the cloud data center A130. Compute, memory, and storage resources which are offered at the edges in the Edge cloud A110 are critical to providing ultra-low latency response times for services and functions used by the endpoint data sources A160 as well as reduce network backhaul traffic from the Edge cloud A110 toward cloud data center A130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to workload data where appropriate, or, bring the workload data to the compute resources. In some examples, a workload includes, but is not limited to executable processes, such as algorithms, machine learning algorithms, image recognition algorithms, gain/loss algorithms, etc.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
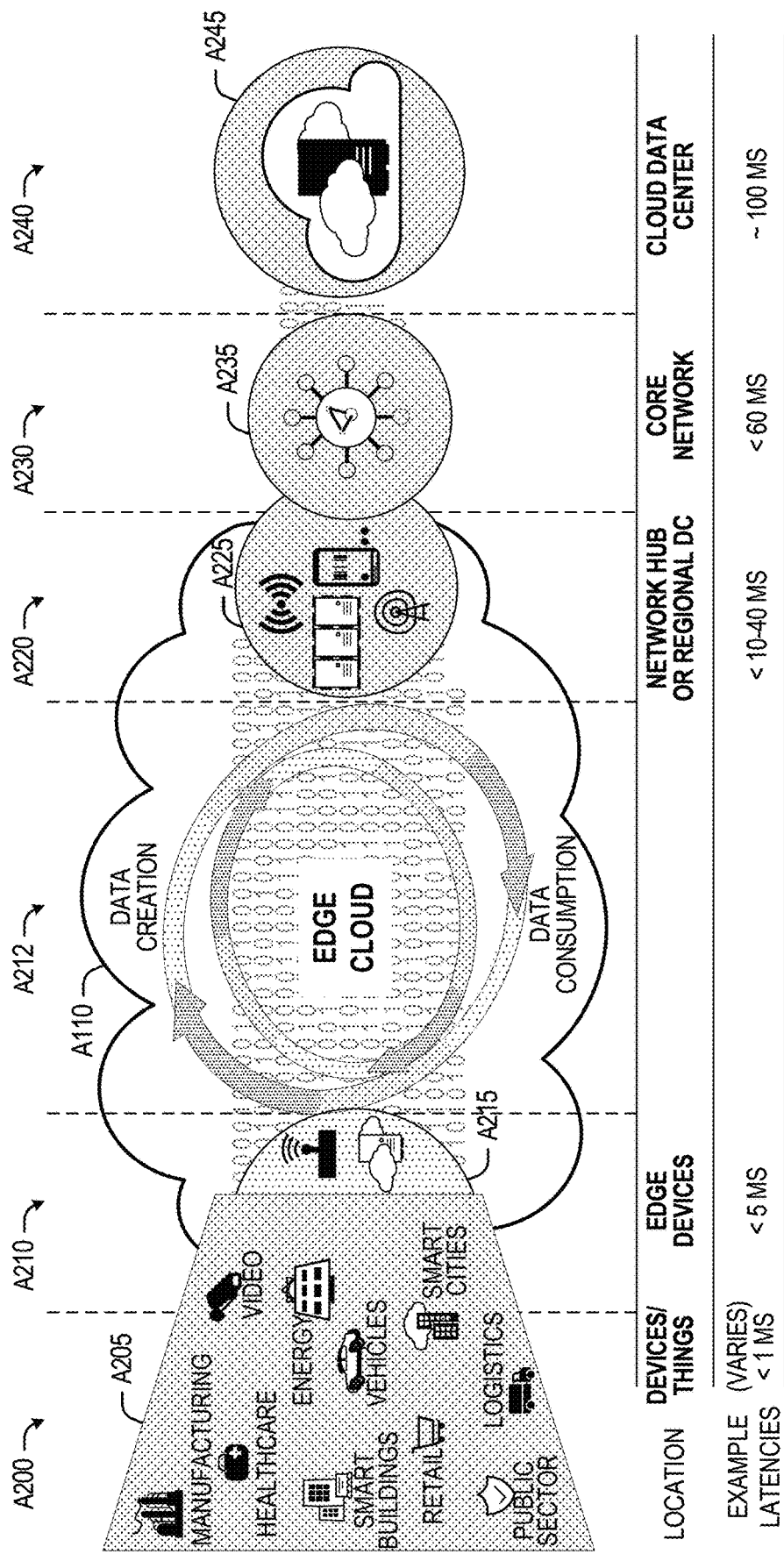
FIG. 2 illustrates operational layers among endpoints, an Edge cloud, and cloud computing environments.

FIG. 2 illustrates operational layers among endpoints, an Edge cloud, and cloud computing environments. Specifically, FIG. 2 depicts examples of computational use cases A205, utilizing the Edge cloud A110 among multiple illustrative layers of network computing. The layers begin at an endpoint (devices and things) layer A200, which accesses the Edge cloud A110 to conduct data creation, analysis, and data consumption activities. The Edge cloud A110 may span multiple network layers, such as an Edge devices layer A210 having gateways, on-premise servers, or network equipment (nodes A215) located in physically proximate Edge systems; a network access layer A220, encompassing base stations, radio processing units, network hubs, regional data centers (DC), or local network equipment (equipment A225); and any equipment, devices, or nodes located therebetween (in layer A212, not illustrated in detail). The network communications within the Edge cloud A110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer A200, under 5 ms at the Edge devices layer A210, to even between 10 to 40 ms when communicating with nodes at the network access layer A220. Beyond the Edge cloud A110 are core network A230 and cloud data center A240 layers, each with increasing latency (e.g., between 50-60 ms at the core network layer A230, to 100 or more ms at the cloud data center layer). As a result, operations at a core network data center A235 or a cloud data center A245, with latencies of at least 50 to 100 ms or more, will not be able to accomplish many time-critical functions of the use cases A205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center A235 or a cloud data center A245, a central office or content data network may be considered as being located within a "near Edge" layer ("near" to the cloud, having high latency values when communicating with the devices and endpoints of the use cases A205), whereas an access point, base station, on-premise server, or network gateway may be considered as located within a "far Edge" layer ("far" from the cloud, having low latency values when communicating with the devices and endpoints of the use cases A205). It will be understood that other categorizations of a particular network layer as constituting a "close", "local", "near", "middle", or "far" Edge may be based on latency, distance, number of network hops, or other measurable characteristics, as measured from a source in any of the network layers A200-A240.

The various use cases A205 may access resources under usage pressure from incoming streams, due to multiple services utilizing the Edge cloud. To achieve results with low latency, the services executed within the Edge cloud A110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate. In some examples, an SLA is an agreement, commitment and/or contract between entities. The SLA may include parameters (e.g., latency) and corresponding values (e.g., time in milliseconds) that must be satisfied before the SLA is deemed in compliance or not.

Thus, with these variations and service features in mind, Edge computing within the Edge cloud A110 may provide the ability to serve and respond to multiple applications of the use cases A205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud A110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud A110 (network layers A200-A240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud A110.

As such, the Edge cloud A110 is formed from network components and functional features operated by and within Edge gateway nodes, Edge aggregation nodes, or other Edge compute nodes among network layers A210-A230. The Edge cloud A110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud A110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the Edge cloud A110 may be servers, multi-tenant servers, appliance computing devices, and/or any other type of computing devices. For example, the Edge cloud A110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 15-17, described in further detail below. The Edge cloud A110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
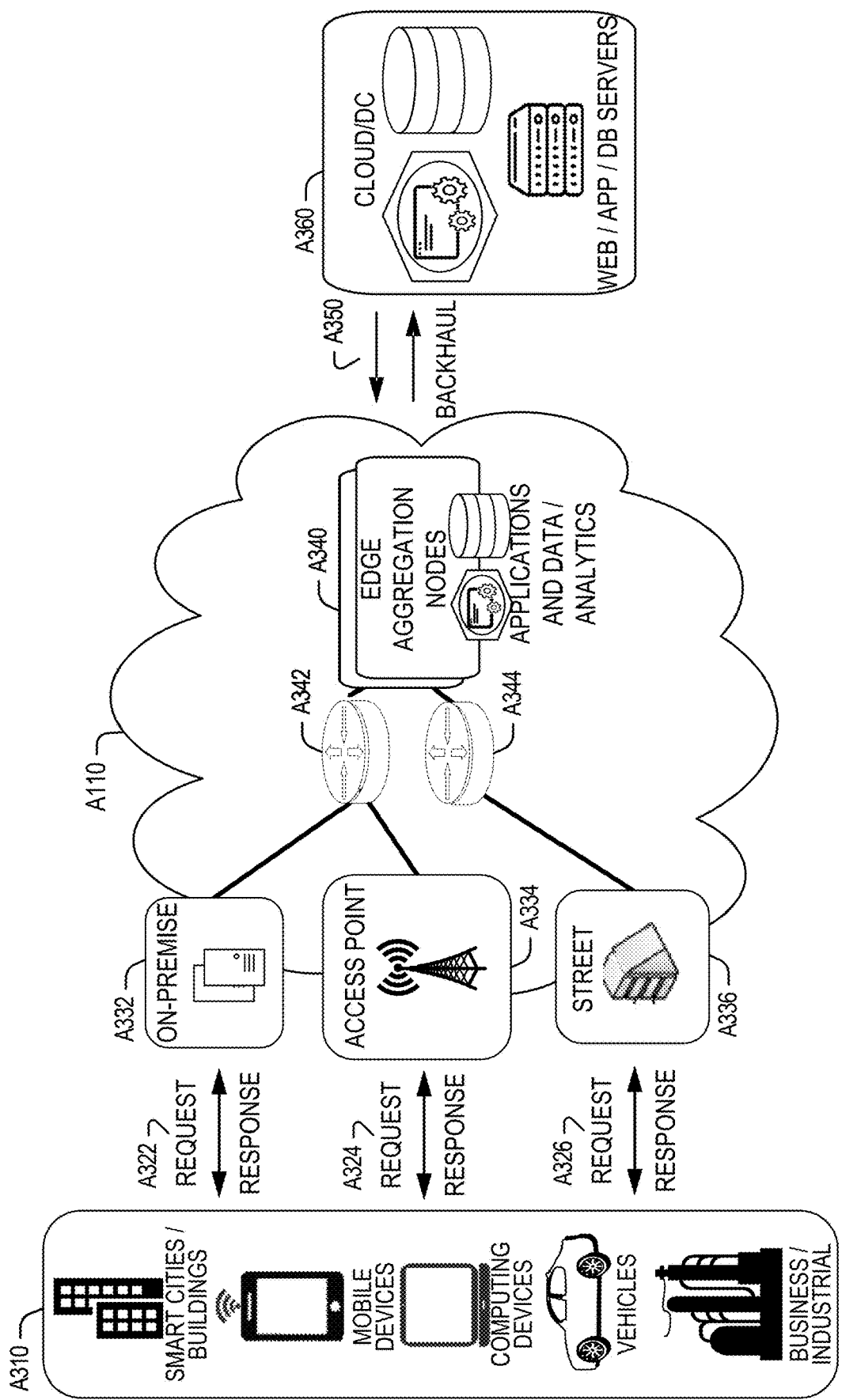
FIG. 3 illustrates an example approach for networking and services in an Edge computing system.

In FIG. 3, various client endpoints A310 (in the form of mobile devices, computers, autonomous vehicles, business computing equipment, industrial processing equipment) exchange requests and responses that are specific to the type of endpoint network aggregation. For instance, client endpoints A310 may obtain network access via a wired broadband network, by exchanging requests and responses A322 through an on-premise network system A332. Some client endpoints A310, such as mobile computing devices, may obtain network access via a wireless broadband network, by exchanging requests and responses A324 through an access point (e.g., cellular network tower) A334. Some client endpoints A310, such as autonomous vehicles may obtain network access for requests and responses A326 via a wireless vehicular network through a street-located network system A336. However, regardless of the type of network access, the TSP may deploy aggregation points A342, A344 within the Edge cloud A110 to aggregate traffic and requests. Thus, within the Edge cloud A110, the TSP may deploy various compute and storage resources, such as at Edge aggregation nodes A340, to provide requested content. The Edge aggregation nodes A340 and other systems of the Edge cloud A110 are connected to a cloud or data center A360, which uses a backhaul network A350 to fulfill higher-latency requests from a cloud/data center for websites, applications, database servers, etc. Additional or consolidated instances of the Edge aggregation nodes A340 and the aggregation points A342, A344, including those deployed on a single server framework, may also be present within the Edge cloud A110 or other areas of the TSP infrastructure.

Figure 4:
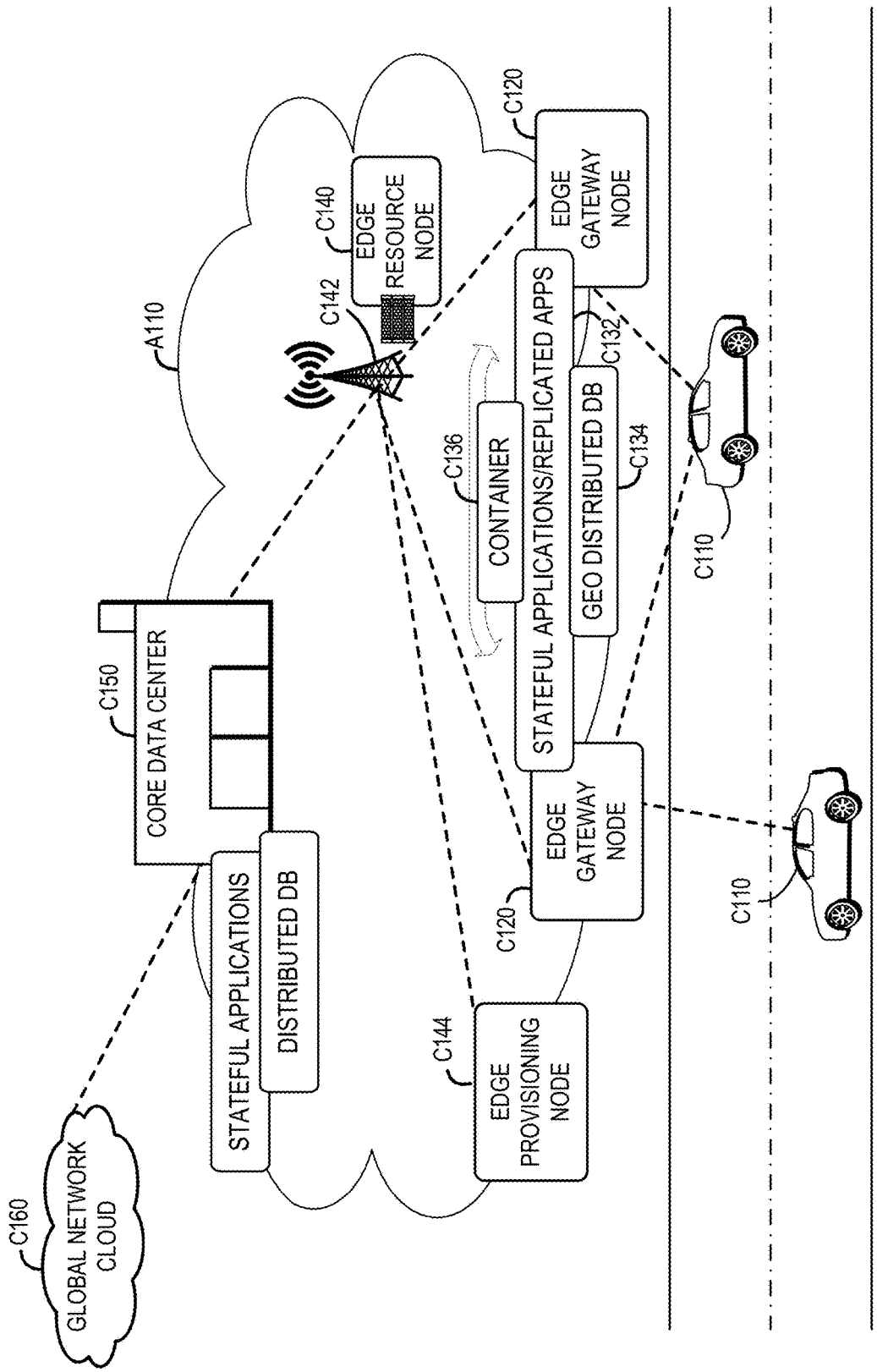
FIG. 4 illustrates a compute and communication use case involving mobile access to applications in an Edge computing system.

It should be appreciated that the Edge computing systems and arrangements discussed herein may be applicable in various solutions, services, and/or use cases involving mobility. As an example, FIG. 4 shows a simplified vehicle compute and communication use case involving mobile access to applications in an Edge computing system C100 that implements an Edge cloud (e.g., the example Edge cloud A110 of FIG. 1). In this use case, respective client compute nodes C110 may be embodied as in-vehicle compute systems (e.g., in-vehicle navigation and/or infotainment systems) located in corresponding vehicles which communicate with the Edge gateway nodes C120 during traversal of a roadway. For instance, the Edge gateway nodes C120 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node C110 and a particular Edge gateway device C120 may propagate so as to maintain a consistent connection and context for the client compute node C110. Likewise, mobile Edge nodes may aggregate at the high priority services or according to the throughput or latency resolution requirements for the underlying service(s) (e.g., in the case of drones). The respective Edge gateway devices C120 include an amount of processing and storage capabilities and, as such, some processing and/or storage of data for the client compute nodes C110 may be performed on one or more of the Edge gateway devices C120.

The Edge gateway devices C120 may communicate with one or more Edge resource nodes C140, which are illustratively embodied as compute servers, appliances or components located at or in a communication base station C142 (e.g., a base station of a cellular network). As discussed above, the respective Edge resource nodes C140 include an amount of processing and storage capabilities and, as such, some processing and/or storage of data for the client compute nodes C110 may be performed on the Edge resource node C140. For example, the processing of data that is less urgent or important may be performed by the Edge resource node C140, while the processing of data that is of a higher urgency or importance may be performed by the Edge gateway devices C120 (depending on, for example, the capabilities of each component, or information in the request indicating urgency or importance). Based on data access, data location or latency, work may continue on Edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The Edge resource node(s) C140 also communicate with the core data center C150, which may include compute servers, appliances, and/or other components located in a central location (e.g., a central office of a cellular communication network). The core data center C150 may provide a gateway to the global network cloud C160 (e.g., the Internet) for the Edge cloud A110 operations formed by the Edge resource node(s) C140 and the Edge gateway devices C120. Additionally, in some examples, the core data center C150 may include an amount of processing and storage capabilities and, as such, some processing and/or storage of data for the client compute devices may be performed on the core data center C150 (e.g., processing of low urgency or importance, or high complexity).

The Edge gateway nodes C120 or the Edge resource nodes C140 may offer the use of stateful applications C132 and a geographic distributed database C134. Although the applications C132 and database C134 are illustrated as being horizontally distributed at a layer of the Edge cloud A110, it will be understood that resources, services, or other components of the application may be vertically distributed throughout the Edge cloud (including, part of the application executed at the client compute node C110, other parts at the Edge gateway nodes C120 or the Edge resource nodes C140, etc.). Additionally, as stated previously, there can be peer relationships at any level to meet service objectives and obligations. Further, the data for a specific client or application can move from Edge to Edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container C136 (or pod of containers) may be flexibly migrated from an Edge node C120 to other Edge nodes (e.g., C120, C140, etc.) such that the container with an application and workload does not need to be reconstituted, re-compiled, re-interpreted in order for migration to work. However, in such settings, there may be some remedial or "swizzling" translation operations applied. For example, the physical hardware at node C140 may differ from Edge gateway node C120 and therefore, the hardware abstraction layer (HAL) that makes up the bottom Edge of the container will be re-mapped to the physical layer of the target Edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 4 may utilize various types of mobile Edge nodes, such as an Edge node hosted in a vehicle (e.g., a car, truck, tram, train, etc.) or other mobile unit, as the Edge node will move to other geographic locations along the platform hosting it. With vehicle-to-vehicle communications, individual vehicles may even act as network Edge nodes for other cars, (e.g., to perform caching, reporting, data aggregation, etc.). Thus, it will be understood that the application components provided in various Edge nodes may be distributed in static or mobile settings, including coordination between some functions or operations at individual endpoint devices or the Edge gateway nodes C120, some others at the Edge resource node C140, and others in the core data center C150 or global network cloud C160.

In further configurations, the Edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an Edge node or data center. A trigger such as, for example, a service use case or an Edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the Edge computing system, various datacenter, Edge, and endpoint (including mobile) devices are used to "spin up" functions (e.g., activate and/or allocate function actions) that are scaled on demand. The function code gets executed on the physical infrastructure (e.g., Edge computing node) device and underlying virtualized containers. Finally, the function(s) is/are "spun down" (e.g., deactivated and/or deallocated) on the infrastructure in response to the execution being completed.

Further aspects of FaaS may enable deployment of Edge functions in a service fashion, including a support of respective functions that support Edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The Edge computing system C100 can include or be in communication with an Edge provisioning node C144. The Edge provisioning node C144 can distribute software to various receiving parties for implementing any of the methods described herein. The example Edge provisioning node C144 may be implemented by any computer server, home server, content delivery network, virtual server, software distribution system, central facility, storage device, storage disk, storage node, data facility, cloud service, etc., capable of storing and/or transmitting software instructions (e.g., code, scripts, executable binaries, containers, packages, compressed files, and/or derivatives thereof) to other computing devices. Component(s) of the example Edge provisioning node C144 may be located in a cloud, in a local area network, in an Edge network, in a wide area network, on the Internet, and/or any other location communicatively coupled with the receiving party(ies). The receiving parties may be customers, clients, associates, users, etc. of the entity owning and/or operating the Edge provisioning node C144. For example, the entity that owns and/or operates the Edge provisioning node C144 may be a developer, a seller, and/or a licensor (or a customer and/or consumer thereof) of software instructions. The receiving parties may be consumers, service providers, users, retailers, OEMs, etc., who purchase and/or license the software instructions for use and/or re-sale and/or sub-licensing.

In an example, Edge provisioning node C144 includes one or more servers and one or more storage devices/disks. The storage devices and/or storage disks host computer readable instructions. Similarly to Edge gateway devices C120 described above, the one or more servers of the Edge provisioning node C144 are in communication with a base station C142 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions from the Edge provisioning node C144.

In some examples, the processor platform(s) that execute the computer readable instructions can be physically located in different geographic locations, legal jurisdictions, etc. In some examples, one or more servers of the Edge provisioning node C144 periodically offer, transmit, and/or force updates to the software instructions to ensure improvements, patches, updates, etc. are distributed and applied to the software instructions implemented at the end user devices. In some examples, different components of the computer readable instructions can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 5:
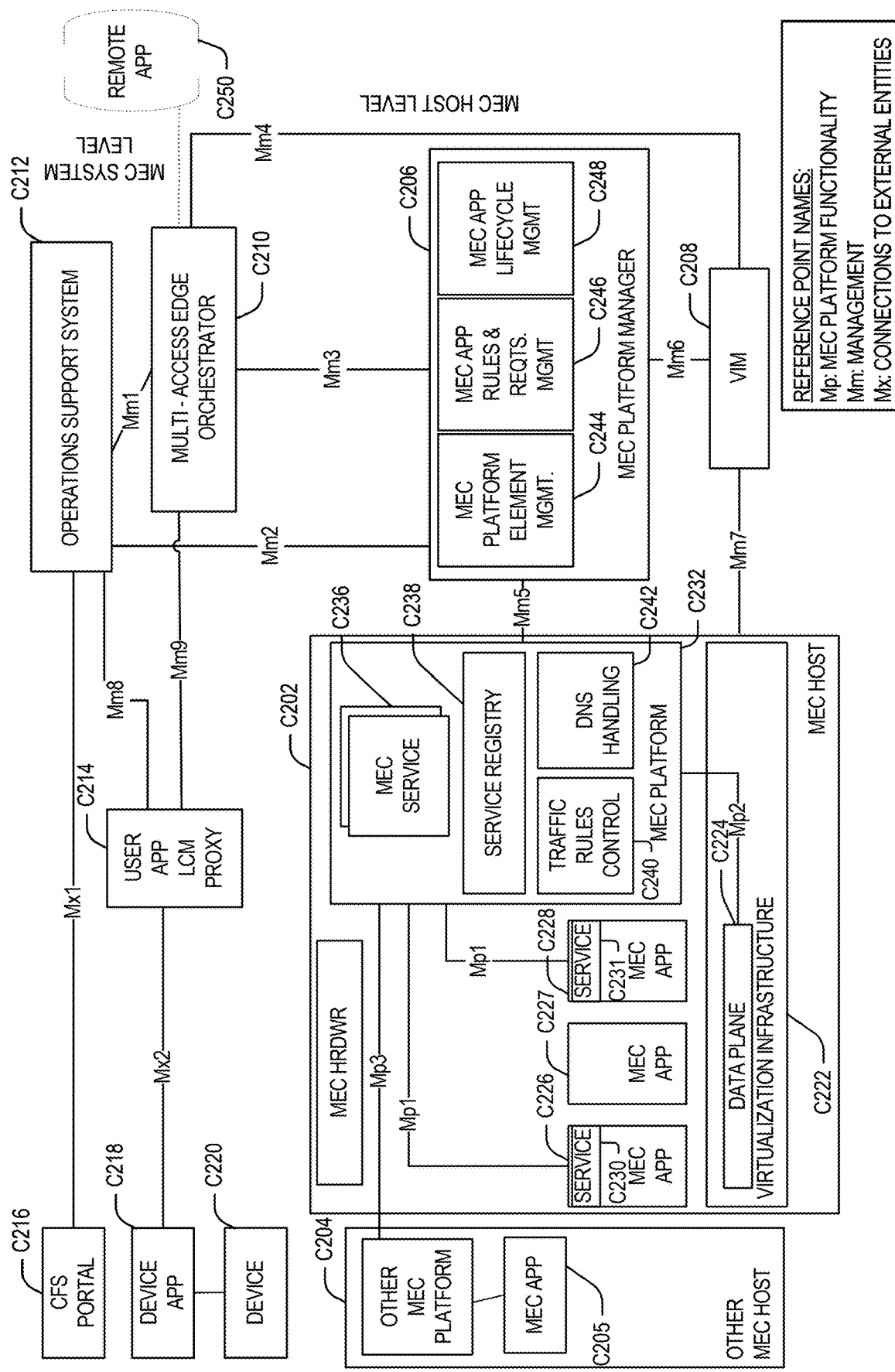
FIG. 5 illustrates an example mobile Edge system reference architecture, arranged according to an ETSI Multi-Access Edge Computing (MEC) specification.

FIG. 5 illustrates a mobile Edge system reference architecture (or MEC architecture) C200, such as is indicated by ETSI MEC specifications. FIG. 5 specifically illustrates a MEC architecture C200 with MEC hosts C202 and C204 providing functionalities in accordance with the ETSI GS MEC-003 specification. In some aspects, enhancements to the MEC platform C232 and the MEC platform manager C206 may be used for providing specific computing functions within the MEC architecture C200.

Referring to FIG. 5, the MEC network architecture C200 can include MEC hosts C202 and C204, a virtualization infrastructure manager (VIM) C208, an MEC platform manager C206, an MEC orchestrator C210, an operations support system C212, a user app proxy C214, a UE app C218 running on UE C220, and CFS portal C216. The MEC host C202 can include a MEC platform C232 with filtering rules control component C240, a DNS handling component C242, a service registry C238, and MEC services C236. The MEC services C236 can include at least one scheduler, which can be used to select resources for instantiating MEC apps (or NFVs) C226, C227, and C228 upon virtualization infrastructure C222. The MEC apps C226 and C228 can be configured to provide services C230 and C231, which can include processing network communications traffic of different types associated with one or more wireless connections (e.g., connections to one or more RAN or telecom-core network entities). The MEC app C205 instantiated within MEC host C204 can be similar to the MEC apps C226-7728 instantiated within MEC host C202. The virtualization infrastructure C222 includes a data plane C224 coupled to the MEC platform via an MP2 interface. Additional interfaces between various network entities of the MEC architecture C200 are illustrated in FIG. 5.

The MEC platform manager C206 can include MEC platform element management component C244, MEC app rules and requirements management component C246, and MEC app lifecycle management component C248. The various entities within the MEC architecture C200 can perform functionalities as disclosed by the ETSI GS MEC-003 specification. In some aspects, the remote application (or app) C250 is configured to communicate with the MEC host C202 (e.g., with the MEC apps C226-C228) via the MEC orchestrator C210 and the MEC platform manager C206.

Figure 6:
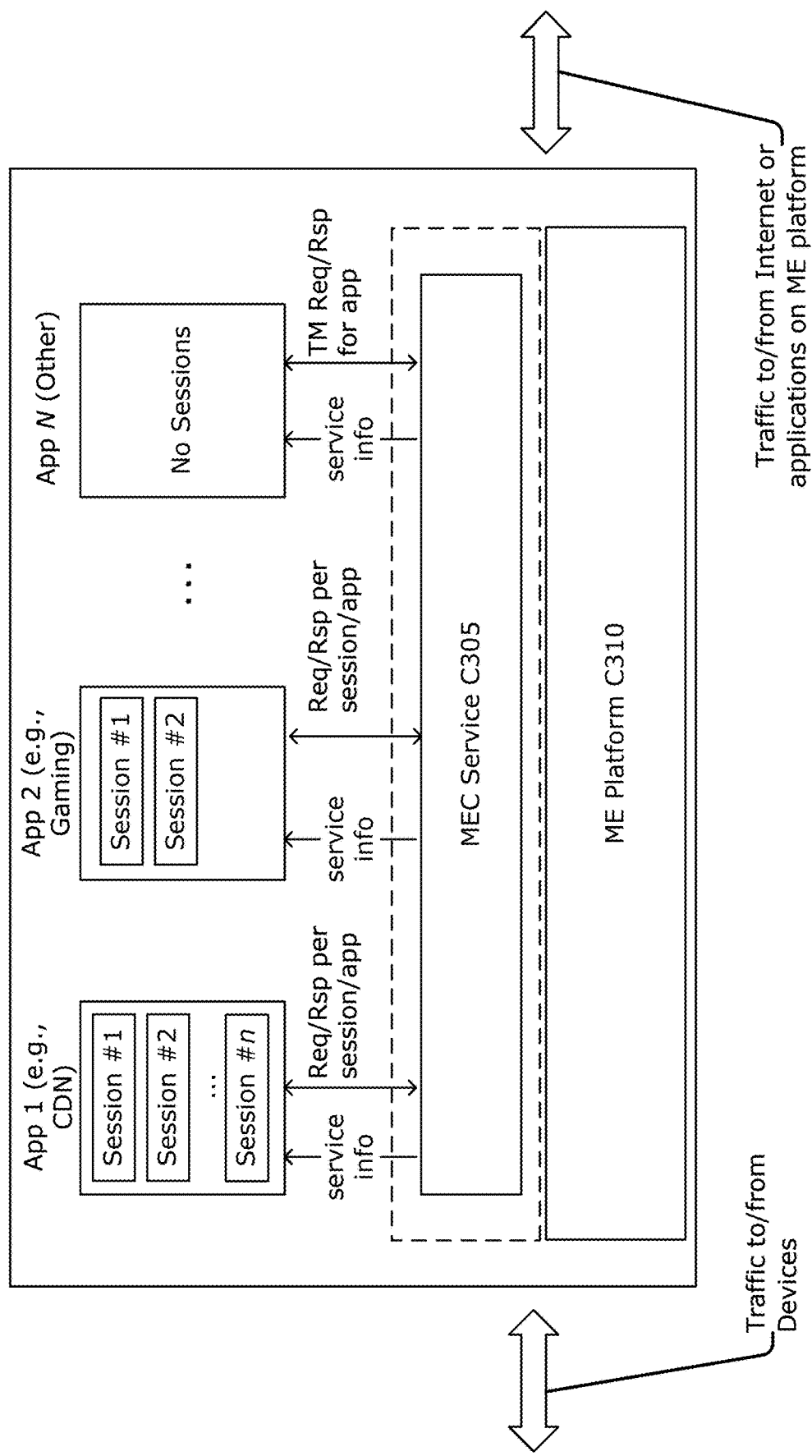
FIG. 6 illustrates an example MEC service architecture.

FIG. 6 illustrates an example MEC service architecture C300. MEC service architecture C300 includes the MEC service C305, a multi-access edge (ME) platform C310 (corresponding to MEC platform C232), and applications (Apps) 1 to N (where N is a number). As an example, the App 1 may be a content delivery network (CDN) app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform C310) and consumers (e.g., UEs, user apps instantiated by individual UEs, other servers/services, network functions, application functions, etc.). Each session represents an interactive information exchange between two or more elements, such as a client-side app and its corresponding server-side app, a user app instantiated by a UE and a MEC app instantiated by the ME platform C310, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE and a DN that provides a PDU connectivity service, which is a service that provides for the exchange of PDUs between a UE and a Data Network. An MA PDU session is a PDU Session that provides a PDU connectivity service, which can use one access network at a time, or simultaneously a 3GPP access network and a non-3GPP access network. Furthermore, each session may be associated with a session identifier (ID) which is data the uniquely identifies a session, and each App (or App instance) may be associated with an App ID (or App instance ID) which is data the uniquely identifies an App (or App instance).

The MEC service C305 provides one or more MEC services C236 to MEC service consumers (e.g., Apps 1 to N). The MEC service C305 may optionally run as part of the platform (e.g., ME platform C310) or as an application (e.g., ME app). Different Apps 1 to N, whether managing a single instance or several sessions (e.g., CDN), may request specific service info per their requirements for the whole application instance or different requirements per session. The MEC service C305 may aggregate all the requests and act in a manner that will help optimize the BW usage and improve Quality of Experience (QoE) for applications.

The MEC service C305 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource". Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of ETSI GS MEC 009 V2.1.1 (2019 January) ("[MEC009]")). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("haps"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry C238 in FIG. 5). It includes the scheme ("hap" or "https"), host and optional port, and an optional prefix string. For the a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

Figure 7:
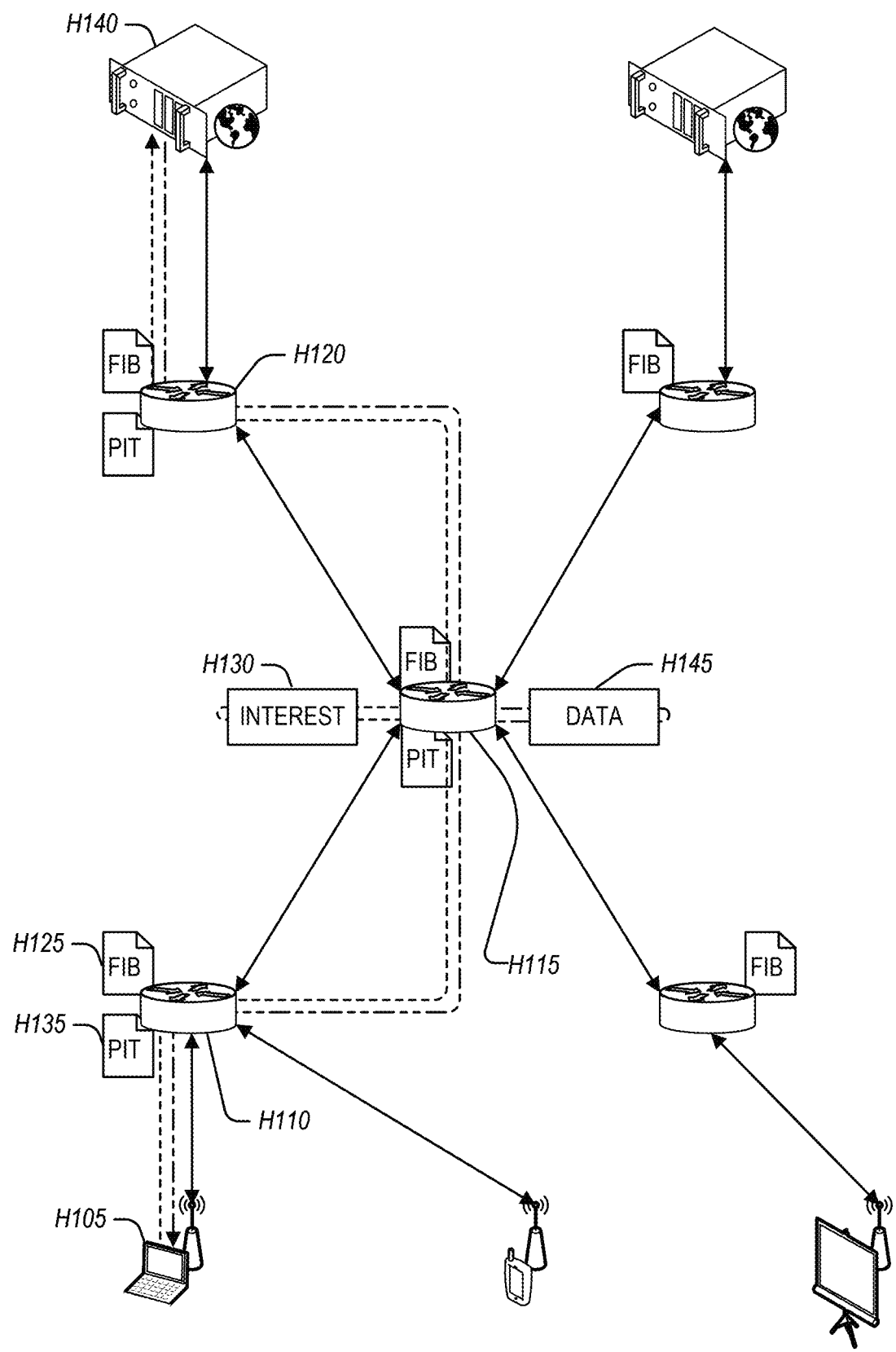
FIG. 7 illustrates an example information centric network (ICN), according to an example.

FIG. 7 illustrates an example information centric network (ICN), according to an example. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, an example device H105 (e.g., subscriber) requests named content from the network itself. The content request may be called an interest and transmitted via an interest packet H130. As the interest packet traverses network devices (e.g., network elements, routers, switches, hubs, etc.)—such as network elements H110, H115, and H120—a record of the interest is kept, for example, in a pending interest table (PIT) at each network element. Thus, network element H110 maintains an entry in its PIT H135 for the interest packet H130, network element H115 maintains the entry in its PIT, and network element H120 maintains the entry in its PIT.

When a device, such as publisher H140, that has content matching the name in the interest packet H130 is encountered, that device H140 may send a data packet H145 in response to the interest packet H130. Typically, the data packet H145 is tracked back through the network to the source (e.g., device H105) by following the traces of the interest packet H130 left in the network element PITs. Thus, the PIT H135 at each network element establishes a trail back to the subscriber H105 for the data packet H145 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest H130 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet H130 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest H130 to data cached in the ICN element. Thus, for example, if the data H145 named in the interest H130 is cached in network element H115, then the network element H115 will return the data H145 to the subscriber H105 via the network element H110. However, if the data H145 is not cached at network element H115, the network element H115 routes the interest H130 on (e.g., to network element H120). To facilitate routing, the network elements may use a forwarding information base H125 (FIB) to match named data to an interface (e.g., physical port) for the route. Thus, the FIB H125 operates much like a routing table on a traditional network device.

In an example, additional meta-data may be attached to the interest packet H130, the cached data, or the route (e.g., in the FIB H125), to provide an additional level of matching. For example, the data name may be specified as "www.somedomain.com or videos or v8675309," but also include a version number—or timestamp, time range, endorsement, etc. In this example, the interest packet H130 may specify the desired name, the version number, or the version range. The matching may then locate routes or cached data matching the name and perform the additional comparison of meta-data or the like to arrive at an ultimate decision as to whether data or a route matches the interest packet H130 for respectively responding to the interest packet H130 with the data packet H145 or forwarding the interest packet H130.

ICN has advantages over host-based networking because the data segments are individually named. This enables aggressive caching throughout the network as a network element may provide a data packet H130 in response to an interest H130 as easily as an original author H140. Accordingly, it is less likely that the same segment of the network will transmit duplicates of the same data requested by different devices.

Fine grained encryption is another feature of many ICN networks. A typical data packet H145 includes a name for the data that matches the name in the interest packet H130. Further, the data packet H145 includes the requested data and may include additional information to filter similarly named data (e.g., by creation time, expiration time, version, etc.). To address malicious entities providing false information under the same name, the data packet H145 may also encrypt its contents with a publisher key or provide a cryptographic hash of the data and the name. Thus, knowing the key (e.g., from a certificate of an expected publisher H140) enables the recipient to ascertain whether the data is from that publisher H140. This technique also facilitates the aggressive caching of the data packets H145 throughout the network because each data packet H145 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Networks are susceptible to various influences that may interrupt their ability to facilitate communication between nodes (e.g., computing nodes, edge nodes, IoT devices, etc.). For instance, events that attract crowds of people, such as sporting events and concerts, may inundate an existing network infrastructure and cause reduced bandwidth capabilities and/or increased latency. In other examples, a network infrastructure may experience one or more failures (e.g., equipment failures, natural disasters, etc.) that reduce bandwidth capabilities, increase latency or completely fail to facilitate communication with the existing network infrastructure.

Mobile ad hoc networks may be deployed to mitigate the above identified network problems. In some examples, drones and/or autonomous mobile robots (AMRs) (e.g., vehicles, autonomous vehicles, etc.) create an ad hoc (e.g., mobile ad hoc network, stationary ad hoc network) network in an on-demand manner. Typically, the fixed infrastructure that is experiencing one or more network problems will detect such problems based on computationally intensive monitoring procedures. In response to detecting one or more problems, the fixed infrastructure typically invokes preconfigured alternate nodes to carry on one or more tasks that are no longer possible due to one or more failed network nodes that may be responsible for the network problems. However, such approaches do not adequately address network resiliency. As used herein, resiliency is a measure of how quickly and/or reliably network operations and capabilities recover from communication anomalies. In some examples, such recovery is performed with authentication safeguards and reduced reliance on traditional permanent infrastructure connectivity and/or preconfigured node relationships. In some examples, improved resiliency is achieved with (a) improved security and (b) improved responsivity to node availability and/or non-availability in a manner that is less dependent on permanent infrastructure availability.

Examples disclosed herein facilitate network deployment and/or node joining/leaving in a resilient manner. Examples disclosed herein enable improved responsivity to network interruption by facilitating node deployment in circumstances where connectivity to a fixed infrastructure may not be possible.

Figure 8:
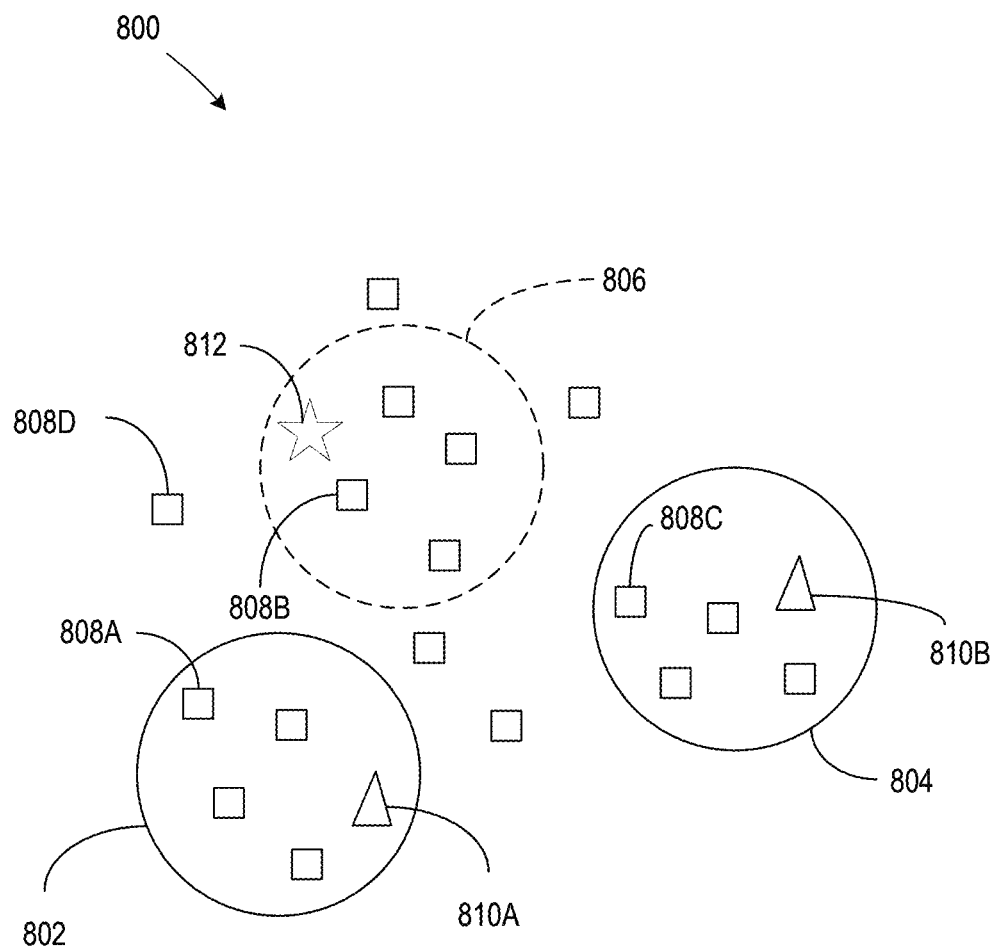
FIG. 8 is a schematic illustration of example networks having improved mobile edge network resiliency.

FIG. 8 is a schematic illustration of example networks 800. In the illustrated example of FIG. 8, the example networks 800 include an example first fixed network 802, an example second fixed network 804 and an example ad hoc network 806. In some examples, the ad hoc network 806 is part of a fixed network (e.g., nodes corresponding to or part of a mobile network (e.g., nodes having a mobile component, such as drones, vehicles, etc.). The example networks 800 of FIG. 8 include any number of network nodes 808, which are represented by a square shape. The example network nodes 808 include different associations with the example first fixed network 802, the example second fixed network 804 and the example ad hoc network 806. In particular, an example first network node 808A is associated with the example first fixed network 802 and may be considered a member thereof. Similarly, an example second network node 108B is associated with the example ad hoc network 806, and an example third network node 108C is associated with the example second fixed network 804, and these nodes may be considered members thereof. However, an example fourth network node 808D does not have any association with an established fixed network or ad hoc network. Instead, the example fourth network node 808D reflects a computing resource (e.g., a compute node) that includes particular processing capabilities that, if requested, may help one or more existing or yet-to-be-existing networks of FIG. 8. For example, in the event the example first fixed network 802 typically communicates with the example second fixed network 804 via the example first network node 108A and the example third network node 808C, respectively, examples disclosed herein enable connectivity to resume in the event one or more of the nodes becomes damaged, inundated and/or otherwise unavailable. For instance, examples disclosed herein enable one or more other node resources to be invoked to supplement one or more failed and/or otherwise unavailable nodes, in which additional nodes are invoked in a resilient manner that considers (a) authentication and (b) capabilities suitable for helping abate communication problems.

In the illustrated example of FIG. 8, the first fixed network 102 includes an example first access point (AP) 810A and the second fixed network 804 includes an example second access point (AP) 810B. The example APs are nodes and are illustrated as a triangle. In some examples, the first AP and/or the second AP are referred to as trusted authorities (TAs) (e.g., third party TAs). As described in further detail below, the APs serve as attachment nodes for a given network and perform, for example, authentication and/or control tasks. The example ad hoc network 806 is sometimes referred to herein as a cluster, which includes an example cluster head 812 (see star shape), which is a node. As described in further detail below, the example cluster head 812 operates as an attachment node for a given cluster and performs, for example, control tasks. As described in further detail below, a cluster represents a dynamic group of nodes that can serve to improve resilient network behaviors in the event of network demand fluctuations and/or network failures (e.g., failed nodes, natural disasters, etc.). Generally speaking, the example nodes 808, APs 810 and cluster heads 812 may be implemented as mobile edge platforms (MEPs), which are nodes that have computing resources with varying capabilities. In some examples, mobile edge platforms (MEPs) are referred to as nodes, and vice versa. As described in further detail below, some MEPs have particular characteristics and capabilities better suited for participation in ad hoc networks. Regardless of the particular capabilities of the MEPs, all MEPs include communication capabilities to form resilient networks, when needed.

Examples disclosed herein enable resilient network coverage using mobile edge platforms (MEPs) and perform rapid recovery and/or instantiation of mobile edge networks or network infrastructure devices in response to discovery of issues in one or more networks. Additionally, examples disclosed herein enable authentication between MEPs in an on-demand (ad hoc) network and provide authorization to provision one or more services across the authenticated MEPs. Further, examples disclosed herein enable workload orchestration across the MEPs in a resilient manner as MEPs join or leave a network. As such, example MEPs disclosed herein create a temporary network infrastructure with resiliency to facilitate services.

Example scenarios addressed herein include generation of resilient mobile edge network formation (using any number of MEPs) for on-demand temporary network infrastructure needs, such as circumstances where sports events attendance causes a traditional infrastructure to struggle with capacity, or emergency situations that place unexpected demands on the network. Example scenarios addressed herein also include generating mobile edge or infrastructure networks as an overlay network standby for on-demand use upon detection of network failures. In some examples, drones and/or autonomous mobile robots (AMRs) (or other vehicles) are deployed to create alternate links and cover one or more gaps in the network. Examples disclosed herein accommodate any type of network interface, such as WiFi, mmWave, satellite, etc.).

Figure 9:
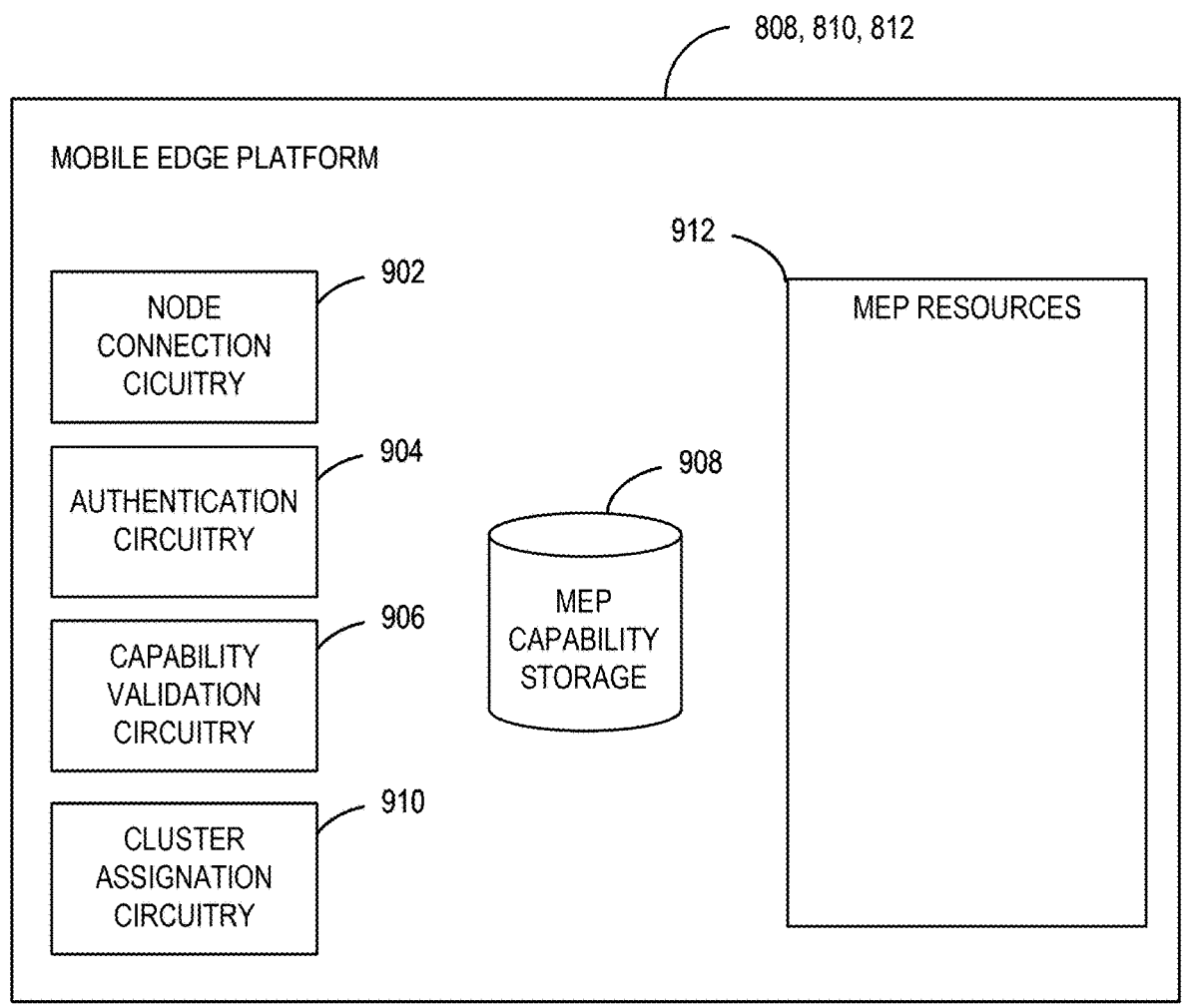
FIG. 9 is a schematic illustration of an example mobile edge platform (MEP) constructed in a manner consistent with this disclosure to improve MEP resiliency.

FIG. 9 is a schematic illustration of an example mobile edge platform (MEP), which may perform the role of: a node (e.g., the example first network node 808A, the example second network node 808B, etc.); an AP (e.g., the example first AP 810A); and/or an example cluster head (e.g., the example cluster head 812). References to the example MEP of FIG. 9 will hereinafter be referenced as MEP 808. In the illustrated example of FIG. 9, the MEP 808 includes example node connection circuitry 902, example authentication circuitry 904, example capability validation circuitry 906, example MEP capability storage 908, example cluster assignation circuitry 910, and MEP resources 912. In some examples, the example node connection circuitry 902, the example authentication circuitry 904, the example capability validation circuitry 906, the example MEP capability storage 908 and the cluster assignation circuitry 910 form a MEP controller 914 (MEP controller circuitry 914). As described above, example MEP resources 912 may vary from one MEP to another, in which some MEPs are relatively more capable with regard to memory resources, computing resources, on board power resources, etc. As such, examples disclosed herein enable improved network resiliency in view of any number of heterogenous nodes (MEPs).

In operation, examples disclosed herein invoke three phases to enable resilient ad hoc networks. A first phase includes authenticating MEPs, a second phase includes authorizing MEP services (capabilities), and a third phase includes orchestrating workloads. In some examples, the phases are performed in sequence from the first phase to the third phase, while in other examples the first phase occurs first and other phases are invoked or re-invoked as needed (e.g., the second phase is re-invoked to reconsider which services are authorized, the third phase is re-invoked to orchestrate workloads in a different manner due to dynamic conditions, etc.).

In the past, authentication keys were used for authentication and re-authentication, such as key pairs. However, such usage of keys requires coordination beforehand, so such techniques are not well suited for ad hoc scenarios where node relationships cannot be established a priori. Other traditional approaches to authenticate nodes includes a public key infrastructure (PKI). However, techniques that employ PKI include single points of vulnerability and have particular bottlenecks. Examples disclosed herein reduce and/or otherwise remove single points of dependency and do not require extensive pre-configuration procedures. Every node needs to be able to discover a trusted authority (TA), which can be a known university, a cell carrier (e.g., Verizon), a list of hotspots, a cell tower, etc. Stated differently, there is no single TA, and the many candidate TAs are discovered in a manner that does not require strict addressing adherence (e.g., discovery occurs in an automated manner). In some examples, TAs may include some configuration information in advance of their deployment, such as TAs that are intended for possible use at a sporting event (e.g., where the TA is a carrier cell).

In the example first phase to authenticate MEPs, zero-trust as a service is needed through a third party point of trust for the mobile edge network to enable authentication between nodes (e.g., MEPs 808) during any cluster formation. The example node connection circuitry 902 creates a back channel with a universally trusted network intermediary that helps provide a durable pre-established identity (ID) for the MEPs. In some examples, MEPs can substantially operate in a geo-located area and, as such, examples disclosed herein include contact information for two or more trusted entities and/or access points (e.g., Internet protocol (IP) addresses, host names, etc.). In some examples, public certificates are stored on the example MEP 808 in case the MEP happens to be in proximity to a corresponding TA such that the certificate can assist in creating a tunnel.

The example node connection circuitry 902 identifies and connects (e.g., via the back channel/tunnel) to a TA using, in some examples, a geo-located list of candidate TAs or Point of Presence (POP) for secure access service(s). In some examples, information centric networking (ICN) techniques are employed for dynamic discovery of the candidate TAs and/or APs. Stated differently, when a candidate MEP seeks authentication, the node connection circuitry 902 of that candidate MEP initiates a search for one of an AP (or TA) and a cluster head. If the example node connection circuitry 902 discovered a TA, then the example authentication circuitry 904 authenticates the MEP and assigns an on-demand identity. In some examples, discovery of the AP is preferred as it confirms that the network is operational and/or otherwise connected to a fixed infrastructure. When the AP is unavailable, this is an indication that a network problem has occurred, such as a natural disaster or a heavily inundated event has strained the network capabilities. In some circumstances, an inability to connect with an available AP occurs when the MEP is particularly far away from the AP, even when no infrastructure problems exist.

Examples disclosed herein do not consider authentication complete until intra-cluster MEP mutual authentication has occurred. In response to detecting a cluster head, the example authentication circuitry 904 initiates the intra-cluster MEP authentication using at least one other MEP associated with the cluster. Stated differently, the node connection circuitry determines whether there are other MEPs that have been recently authenticated, which may be assigned and/or otherwise placed in a default cluster of MEPs. If other MEPs exist (e.g., in this default cluster), the example authentication circuitry 904 performs an intra-cluster MEP mutual authentication to completely authenticate the new MEP. Intra-cluster MEP mutual authentication includes comparing characteristics of previously authenticated MEPs against the current MEP to be authenticated. In some examples, the candidate MEP to be authenticated will transmit its historical activity data to the at least one MEP already part of the cluster so that its peers can dictate authentication is appropriate or not (e.g., based on a general consensus in a manner consistent with one or more voting algorithms). Historical activity data may include, but is not limited to, previous connection success, previous connection failure (e.g., rejection), previous and/or capable communication connection types (e.g., node connection via WiFi, node connection via Bluetooth, node connection via cellular radio, etc.). In some examples, cluster peers may evaluate the historical activity data in view of an example voting algorithm to grant or deny access to the cluster. For instance, acceptance of the candidate MEP into the cluster may require a particular connection type (e.g., low power WiFi only), a particular success rate of prior cluster memberships, or a particular success rate of using a particular communication connection type (e.g., indicative of a communication reliability of the candidate MEP). Characteristics of interest include the on-demand ID and its history. For instance, if a particular MEP on-demand ID is associated with prior rejection occurrences (e.g., a threshold number of rejection occurrences) as evidenced by one or more MEPs within the cluster, then the current MEP to be authenticated can be rejected from cluster participation. In some examples, a voting algorithm is invoked by the authentication circuitry 904 to retrieve participating MEP inputs regarding rejecting or accepting the candidate MEP to be authenticated.

In some examples, the node connection circuitry 902 determines that a TA is not available for the candidate MEP to be authenticated. Such circumstances may occur when a fixed infrastructure is no longer available, such as in response to a natural disaster that destroys and/or otherwise disables one or more MEPs that normally make up the network and/or portions of the network. In such circumstances, the example node connection circuitry 902 identifies and connects to an available cluster head (e.g., a particular MEP), such as the example cluster head 812 of FIG. 1. While the example cluster head 812 is not a TA or an AP because it is not connected to a fixed architecture, the cluster head 812 has the capability of assisting authentication based on historical information from already-authenticated MEPs within the cluster. As discussed above, some of the already-authenticated MEPs include information corresponding to potentially rogue MEPs and their corresponding identifying characteristics, such as on-demand IDs that are analyzed by the example authentication circuitry 904. In the event a candidate MEP has been rejected a threshold number of times by its peers, then the candidate MEP will not be authenticated and/or otherwise rejected.

As described above, clusters represent a group or collection of nodes (MEPs) that contribute to one or more networking objectives/tasks. MEP membership in a particular cluster is a function of the MEP's capabilities, including its on-board resources and/or its availability in view of competing demands. Prior to authentication, a MEP is unassociated with a cluster. In some examples, authentication can be performed on MEPs without regard to any particular cluster because the candidate MEP still requires analysis of its capabilities before cluster assignment occurs. In some examples, an initial cluster is assigned to the MEP (or the MEP is assigned to a particular cluster) in a default manner for the purpose of completing authentication. As described in further detail below, authenticated MEPs are later associated with an appropriate cluster. In some examples, the cluster assignation circuitry 910 will cause the candidate MEP to be authenticated to store results of the authentication results (e.g., an authentication metric of "success" or "failure") in a secure storage, which may include a blockchain. In some examples, after the candidate MEP has been authenticated and operational for a period of time (e.g., a threshold period of time), re-authentication is invoked in an abundance of caution. During the re-authentication attempt, search efforts attempt to find an AP in case the previous network problems have abated. In such circumstances where the AP is detected at a second time, examples disclosed herein invoke a network maintenance request to facilitate any maintenance and/or repairs that may be necessary.

In the example second phase to authorize MEP services, the example node connection circuitry 902 selects a MEP of interest that has completed the example first phase of authentication. In some examples, an authenticated MEP solicits cluster membership. In particular, the soliciting MEP attempts to gain cluster membership by transmitting its on-demand ID and its capability list to the cluster head. MEPs belonging to a resilient mobile edge network contribute to services (e.g., video surveillance, video aggregation for scene reconstructions for augmented reality and/or virtual reality services, scene capturing and replay in sports events, etc.). Because such MEPs join the mobile edge networks in an ad hoc fashion, authorization to services provisioning is needed. Worth noting is that during any one of the first, second and/or third phases there are particular circumstances that affect operations of authentication, service authorization and workload orchestration. The example node connection circuitry 902 determines whether an AP is available, which is indicative of whether current network circumstances include access to a fixed infrastructure (or whether the fixed infrastructure is no longer available, such as in response to a natural disaster). The example node connection circuitry 902 determines whether an AP is available. If so, then a fixed infrastructure is available and the example MEP can operate in a manner consistent with those conditions. If the node connection circuitry 202 determines that there is no AP available, then a fixed infrastructure is not available.

In the event the fixed infrastructure is available, the example node connection circuitry 902 identifies the available AP, and the example capability validation circuitry 906 retrieves the on-demand ID to initiate MEP capability discovery. MEP capabilities discovered and stored by the example capability validation circuitry 906 include, but are not limited to memory capacity, memory speed, processor core quantity, etc. In some examples, capabilities are determined by the capability validation circuitry 206 by analyzing the example MEP resources 912 of FIG. 2. In some examples, the capability validation circuitry 906 stores a list of the MEP capabilities (a capability list) in a secure memory (e.g., a secure enclave, software guard extensions, etc.). The example node connection circuitry 902 transmits the on-demand ID and capability data to the available AP, and the example capability validation circuitry 906 determines whether the candidate MEP is appropriate for the ad hoc network to be created. In some examples, the ad hoc network to be created is based on a particular need, such as the ability to process relatively small data packets (e.g., low bandwidth) in a relatively fast manner (e.g., a sporting event to handle WiFi communication). Conversely, in some examples the ad hoc network is to process relatively large data packets (e.g., high bandwidth) with less concern for speed. In any event, cluster creation includes parameters that, when satisfied, aid the objective of the ad hoc network. As such, candidate MEP capabilities need to meet particular ones of these parameters based on the particular capabilities of the candidate MEPs.

The example capability validation circuitry 906 compares the capabilities of the candidate MEP to the parameter requirements of the cluster to determine whether to accept the MEP or reject the MEP join. If the capability validation circuitry 906 rejects the joining of the candidate MEP, then that particular MEP may not fit the needs of the cluster. Accordingly, a re-assessment may occur in view of another/separate cluster to see whether the candidate MEP is an appropriate fit for the needs of that other cluster. However, if the capability validation circuitry 906 validates and/or otherwise accepts the MEP, meaning that the candidate MEP can perform needed services based on its capabilities, the example cluster assignment circuitry 910 assigns a lifetime duration for the MEP services. In particular, rather than merely assume that services validated at a first time are appropriate all the time, improved resiliency is achieved by periodic verification that services, nodes and corresponding cluster memberships are consistent with the needs of a network during potentially dynamic circumstances (e.g., failures due to natural disasters, changed circumstances due to larger-than-expected crowds, etc.). In other words, when the duration expires (e.g., based on an expired timer, or a timer that satisfies the cluster membership duration), then the services must be re-assessed in view of alternate needs of the network, alternate needs of the AP, or dynamically changing capabilities of the MEP. Stated differently, when the cluster membership duration is satisfied (e.g., expired), then cluster membership solicitation is re-initiated. As such, the lifetime duration for the MEP services ensures that previously validated services do not become antiquated or irrelevant in view of dynamic network circumstances. At the expiration of the lifetime duration, the example authentication circuitry 204 re-retrieves the on-demand ID to re-evaluate the MEP capabilities, which are again compared to the needs/parameters of the cluster (e.g., cluster needs/objectives may change over time).

Figure 10A:
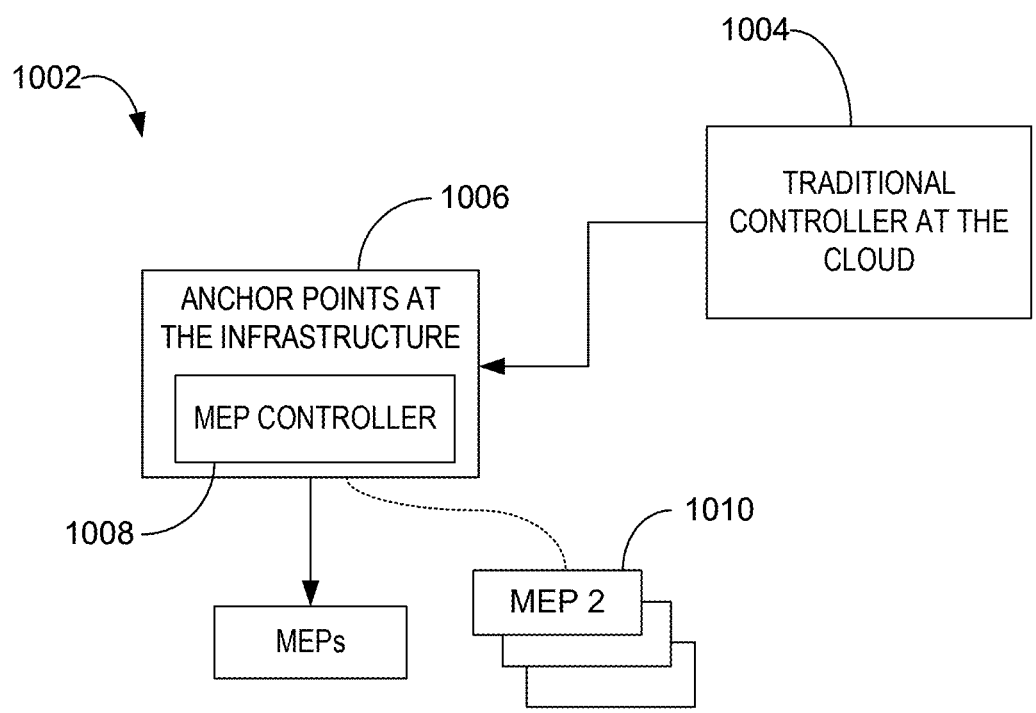
FIGS. 10A and 10B are schematic illustrations of example multi-tier controller frameworks.

In the example third phase to orchestrate workloads, MEP ingress and egress activities are managed. The example node connection circuitry 902 determines whether the candidate MEP is joining a workload effort, and the example capability validation circuitry 906 determines whether the candidate MEP can be connected to a fixed infrastructure. In the event the fixed infrastructure is available, the example node connection circuitry 902 determines whether a cloud controller is present. FIG. 10A is a schematic illustration of a multi-tier controller framework 1002 in which an example traditional cloud controller 1004 is communicatively connected to an AP 1006. As discussed above, the example AP 1006 may be realized as a primary MEP (e.g., an attachment MEP), as shown in FIG. 8 (see element 810A and/or 810B). The example AP 1006 of FIG. 10A includes an example MEP controller 1008 to manage workload assignments for any number of connected MEPs 1010. Example workload orchestration takes place through expanding the cloud native workload orchestration frameworks (e.g., Kubernetes) for MEPs.

Figure 10B:
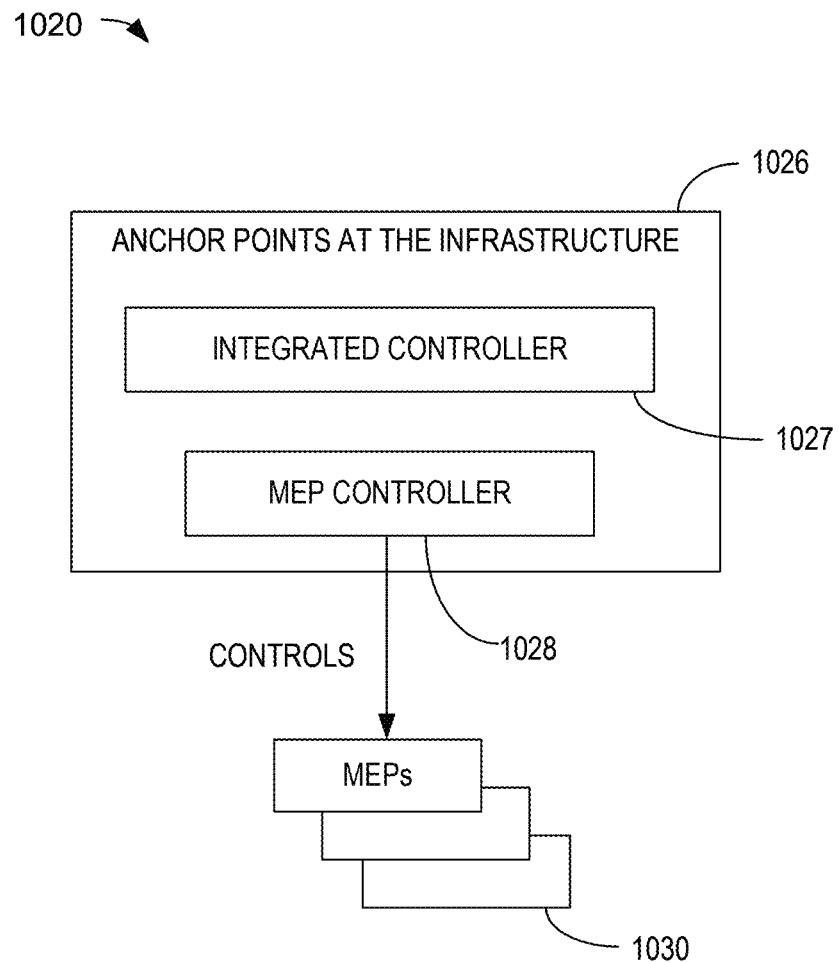

On the other hand, in circumstances where the node connection circuitry 902 determines that there is no cloud controller present, then an available AP is established as the workload controller. FIG. 10B is a schematic illustration of an alternative multi-tier controller framework 1020. In the illustrated example of FIG. 10B, an AP 1026 is not communicatively connected to a cloud and, instead, an example workload orchestration framework (e.g., Kubernetes) controller 1027 is integrated within the AP 1026 to further control an example MEP controller 1028. The example MEP controller 1028 operates as a surrogate tier to the example workload orchestration framework controller 1027 to control any number of connected MEPs 1030.

Once a controller framework is determined, the example node connection circuitry 902 retrieves a MEP cluster match request, in which the request includes telemetry on particular capabilities of a candidate MEP. In particular, cluster membership or association with particular MEPs occurs after a threshold quantity of candidate MEPs is authenticated and their corresponding capabilities are discovered. The example cluster assignation circuitry 910 performs clustering of any number of MEPs in an effort to identify optimized candidate MEPs to include in a cluster membership. In some examples, K-Means clustering is performed by the example cluster assignation circuitry 910. The example cluster assignation circuitry 910 transmits (e.g., to a MEP requesting membership to a cluster of interest) (i) a current join status (e.g., no current cluster membership, particular cluster membership), (ii) types of services in the cluster that the requesting MEP may be able to handle, (iii) an engagement duration value to identify and/or otherwise inform the MEP of its service obligations (if it should choose to accept), and (iv) a minimum type and/or quantity of resources needed to be allocated during the engagement duration. For example, some MEPs may be capable of satisfying any number of different requestors, some of which may already be utilizing some resources of the MEP. As such, information related to the minimum type and/or quantity of needed resources helps the workload controllers manage expectations of MEPs regarding when their resources (e.g., particular computing resources, cores, processors, accelerators, memory, etc.) might be relinquished for other consumers.

The example cluster assignation circuitry 910 calculates a success rate for the candidate MEP(s) in a manner analogous to a score. Particular MEPs having resources that match a workload and/or cluster parameters of interest will yield a higher score that is indicative of a closer and/or otherwise more appropriate match being capable of satisfying cluster objectives. The example cluster assignation circuitry 910 retrieves MEP acceptance or rejection based on the success rate and corresponding cluster heads and/or clusters.

In some examples, workload orchestration must occur without the benefit of connectivity to a fixed infrastructure. When the example capability validation circuitry 906 determines that the MEP is not able to connect to a fixed infrastructure, the example cluster assignation circuitry 910 determines whether a cluster head has been elected for the cluster of interest. If not, then the MEP may self elect if it is the first MEP to form the cluster, otherwise if two or more MEPs already form parts of the cluster, the MEPs invoke a consensus algorithm to elect the cluster head (e.g., the example cluster head 812 of FIG. 8). Thereafter, MEP acceptance or rejection occurs in a manner consistent with the above identified techniques that, in part, perform clustering based on capabilities, transmit join status, types of services, engagement duration values, and minimum resources needed, and success rate calculation to identify the most suitable MEPs for the cluster of interest.

In some examples, the apparatus includes means for connecting nodes, means for authenticating, means for validating capabilities, and means for assigning clusters. For example, the means for connecting nodes may be implemented by node connection circuitry 902, the means for authenticating may be implemented by authentication circuitry 904, the means for validating capabilities may be implemented by capability validation circuitry 906, and the means for assigning clusters may be implemented by cluster assignation circuitry 910. In some examples, the aforementioned circuitry may be implemented by machine executable instructions such as that implemented by at least blocks corresponding to FIGS. 11-14 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the above-identified circuitry is implemented by other hardware logic circuitry, hardware implemented state machines, and/or any other combination of hardware, software, and/or firmware. For example, the above-identified circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the example MEPs 808, 810, 812 of FIGS. 8 and 9 are illustrated in FIGS. 8, 9, 10A and 10B, one or more of the elements, processes, and/or devices illustrated in FIGS. 11-14 may be combined, divided, re-arranged, omitted, eliminated, and/or implemented in any other way. Further, the example node connection circuitry 902, the example authentication circuitry 904, the example capability validation circuitry 906, the example cluster assignation circuitry 910, and/or, more generally, the example MEPs 808, 810, 812 of FIGS. 8, 9, 10A and 10B, may be implemented by hardware, software, firmware, and/or any combination of hardware, software, and/or firmware. Thus, for example, any of the example node connection circuitry 902, the example authentication circuitry 904, the example capability validation circuitry 906, the example cluster assignation circuitry 910, and/or, more generally, the example MEPs 808, 810, 812 of FIGS. 8, 9, 10A and 10B, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), secure enclaves, and/or field programmable logic device(s) (FPLD(s)) such as Field Programmable Gate Arrays (FPGAs). When reading any of the apparatus or system claims of this patent to cover a purely software and/or firmware implementation, at least one of the example node connection circuitry 902, the example authentication circuitry 904, the example capability validation circuitry 906, the example cluster assignation circuitry 910, and/or, more generally, the example MEPs 808, 810, 812 of FIGS. 8, 9, 10A and 10B is/are hereby expressly defined to include a non-transitory computer readable storage device or storage disk such as a memory, a digital versatile disk (DVD), a compact disk (CD), a Blu-ray disk, etc., including the software and/or firmware. Further still, the example MEPs 808, 810, 812 of FIGS. 8, 9, 10A and 10B may include one or more elements, processes, and/or devices in addition to, or instead of, those illustrated in FIGS. 8, 9, 10A and 10B, and/or may include more than one of any or all of the illustrated elements, processes and devices.

Flowcharts representative of example hardware logic circuitry, machine readable instructions, hardware implemented state machines, and/or any combination thereof for implementing the MEPs 808, 810, 812 of FIGS. 8, 9, 10A and 10B are shown in FIGS. 11-14. The machine readable instructions may be one or more executable programs or portion(s) of an executable program for execution by processor circuitry, such as the processor circuitry 1512 shown in the example processor platform 1500 discussed below in connection with FIG. 15 and/or the example processor circuitry discussed below in connection with FIGS. 16 and/or 17. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 11-14, many other methods of implementing the example MEPs 808, 810, 812 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 11-14 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 11:
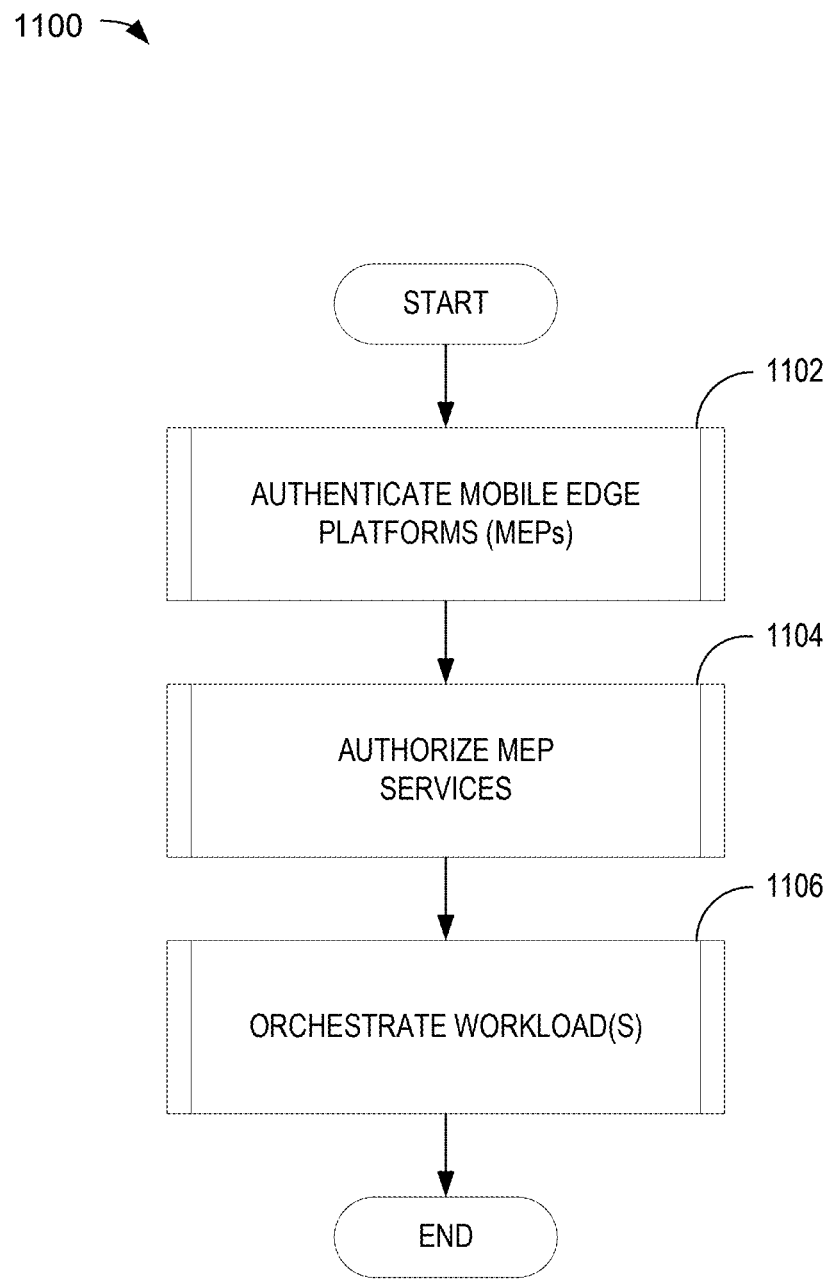
FIGS. 11-14 are flowcharts representative of example machine readable instructions that may be executed by example processor circuitry to implement the example MEP of FIGS. 8, 9, 10A and 10B to improve MEP resiliency.

FIG. 11 is a flowchart representative of example machine readable instructions and/or example operations 1100 that may be executed and/or instantiated by processor circuitry to improve mobile edge platform resiliency. The machine readable instructions and/or operations 1100 of FIG. 11 begin at block 1102, at which the example node connection circuitry 902 (and other circuitry as described above and in further detail below) initiates authentication of mobile edge platforms (MEPs), such as the example MEPs 808, 810, 812 of FIGS. 8, 9, 10A and 10B. In response to one or more MEPs that have been authorized to participate on an ad hoc network (e.g., in response to a natural disaster, in response to abrupt utilization demands, etc.), the example node connection circuitry 902 (and other circuitry as described above and in further detail below) initiates authorization of MEP services (block 1104). Additionally, the example node connection circuitry 902 (and other circuitry as described above and in further detail below) performs workload orchestration with the authenticated and service-authorized MEPs (block 1106).

Figure 12:
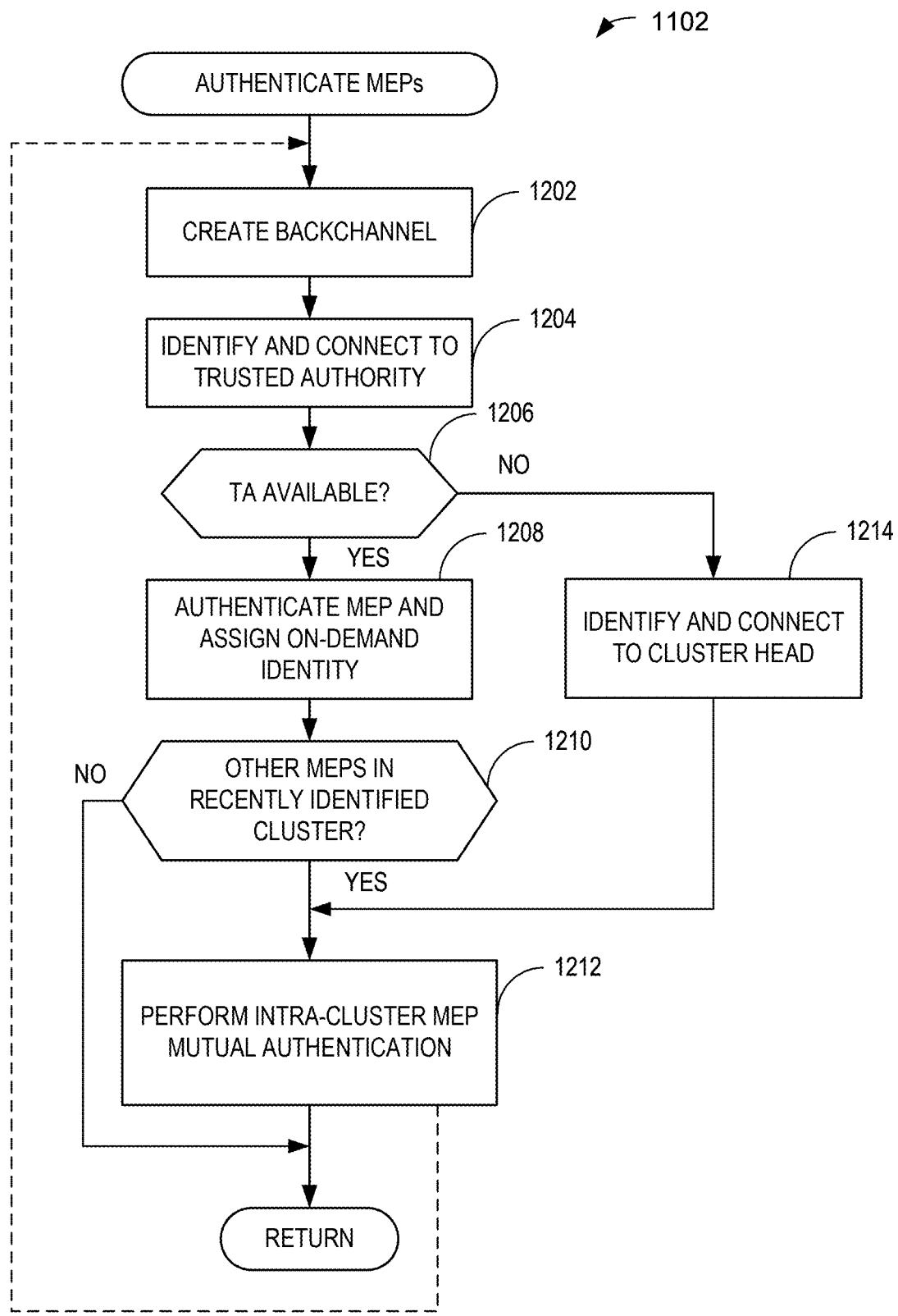

FIG. 12 illustrates additional detail corresponding to authentication of MEPs (block 1102). In the illustrated example of FIG. 12, the example node connection circuitry 902 creates a back channel with a universally trusted network intermediary (block 1202), and identifies an available trusted authority (block 1204). In some examples, the node connection circuitry 902 invokes information centric networking (ICN) to identify candidate TAs proximate to the MEP 108. In the event the node connection circuitry 902 is successful in locating a TA (block 1206), then the example authentication circuitry 904 authenticates the MEP and assigns an on-demand identity (block 1208). Because the MEP is previously unauthenticated, it does not have any prior association with a cluster of other nodes (e.g., other MEPs). The example node connection circuitry 902 determines whether a cluster of interest (e.g., a default cluster in proximity to the MEP to be joined for purposes of initial authentication) includes other MEPs therein (block 1210). If so, the example authentication circuitry 904 performs intra-cluster MEP mutual authentication (block 1212). In the event there are no other MEPs in the candidate cluster (block 1210), then the example authentication circuitry 904 associates the MEP with the candidate cluster as a default for later intra-cluster MEP mutual authentication when two or more MEPs are available in the cluster. Briefly returning to block 1206, in the event the node connection circuitry 902 determines that a TA is not available, then the example node connection circuitry 902 identifies and connects to a cluster head (block 1214) (e.g., which acts as a surrogate for the TA in circumstances where a fixed infrastructure is not available). The example authentication circuitry 904 then performs intra-cluster MEP mutual authentication (block 1212). The example program 1102 then ends and control advances to block 1104. However, the illustrated example of FIG. 11 can operate in a loop fashion to handle on-demand needs of (a) authentication (block 1102), (b) services authorization on a MEP-by-MEP basis (block 1104) and (c) workload management (block 1106).

Figure 13:
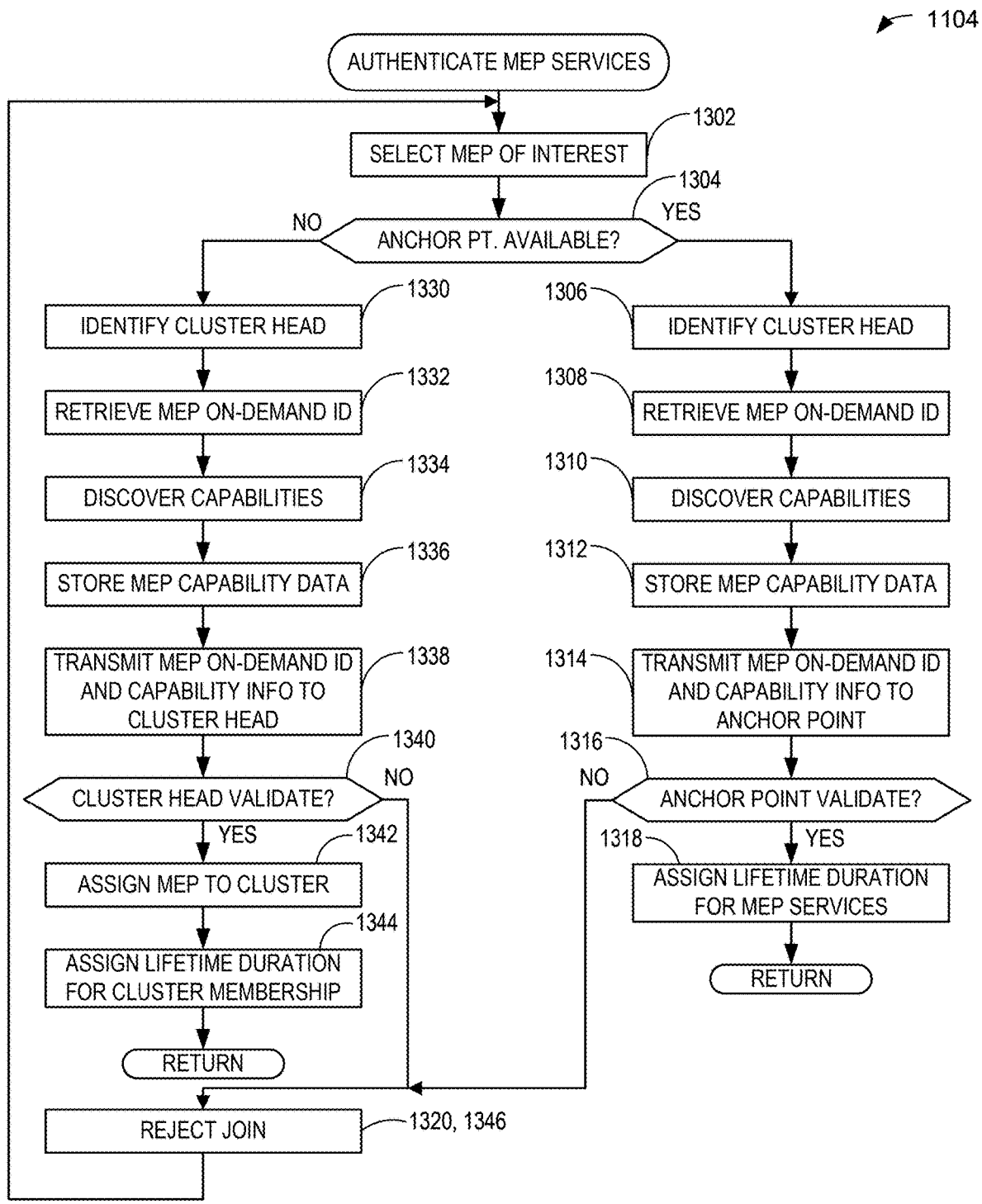

FIG. 13 illustrates additional detail corresponding to authorizing MEP services (block 1104 of FIG. 11). In the illustrated example of FIG. 13, the example node connection circuitry 902 selects a MEP of interest (block 1302). For example, any number of candidate MEPs may have been authenticated in one or more prior batch operations, but those MEPs may not yet have been analyzed to determine their respective capabilities in view of particular cluster needs/objectives. The example node connection circuitry 902 determines whether one or more APs are available (block 1304), thereby establishing whether a fixed infrastructure is available to assist MEP onboarding, or whether there is no available AP and, thus, cluster head(s) must be discovered, as described above and in further detail below.

In the event the example node connection circuitry 902 determines that APs are available (block 1304), the specific AP is identified (block 1306) and the example authentication circuitry 204 retrieves the MEP's on-demand ID (block 1308). The example capability validation circuitry 906 discovers one or more capabilities of the MEP (block 1310), such as a number of available processor cores, an amount and/or type of memory, a type of accelerator, etc. Such capability information is stored in a data store for later retrieval in a secure manner (block 1312), such as within Intel SGX memory. The example node connection circuitry 902 transmits the MEP on-demand ID and capability information to an AP (block 1314) in an effort to determine whether the candidate MEP is an appropriate node for the needs of the fixed infrastructure that might be experiencing network problems. The example capability validation circuitry 906 determines whether the AP is an appropriate MEP suitable for joining the cluster (block 1316) and if so, the example cluster assignation circuitry 910 assigns a lifetime duration for MEP services corresponding to the candidate MEP (block 1318). However, in the event the capability validation circuitry determines that the AP does not validate the MEP (e.g., the candidate MEP does not have appropriate and/or otherwise sufficient resources to assist the cluster) (block 1316), then the example cluster assignation circuitry 910 rejects the join attempt (block 1320) and control returns to block 1302 to evaluate one or more other candidate MEPs for their suitability. In some examples, the example program 1104 exits and/or otherwise returns after a join has been rejected (block 1320) or after the lifetime duration has been assigned (block 1318). As described above, examples disclosed herein may operate in a loop fashion to continuously process candidate MEPs as needed.

Returning to block 1304, in the event the example node connection circuitry 902 determines that an AP is not available, which indicates that a fixed infrastructure is not available, examples disclosed herein still allow network recovery and healing for such unforeseen circumstances. In particular, the example node connection circuitry 902 identifies at least one available cluster head (block 1330), and the example authentication circuitry 204 retrieves the MEP on-demand ID (block 1332). The example capability validation circuitry 906 discovers one or more capabilities of the candidate MEP (block 1334) and stores such capability information/data in storage (block 1336), such as the example MEP capability storage 908 of FIG. 9.

Because the cluster head is part of a particular cluster that has a particular set of needs, the example node connection circuitry 902 transmits the MEP on-demand ID and capability information to the cluster head (block 1338) in an effort to find a suitable candidate MEP that is capable of satisfying the needs of the cluster. The example capability validation circuitry 906 determines whether the cluster head accepts (validates) the candidate MEP based on its capabilities (block 1340) and, if so, the example cluster assignation circuitry 910 assigns the candidate MEP to the cluster (block 1342). The example cluster assignation circuitry 910 also assigns a lifetime duration for that cluster membership (block 1344). Briefly returning to block 1340, in the event the capability validation circuitry 906 determines that the cluster head does not accept (validate) the candidate MEP, then the example cluster assignment circuitry 910 rejects the join attempt and control returns to block 1302 or, in some examples, the program 1104 ends and control advances to block 1106.

Figure 14:
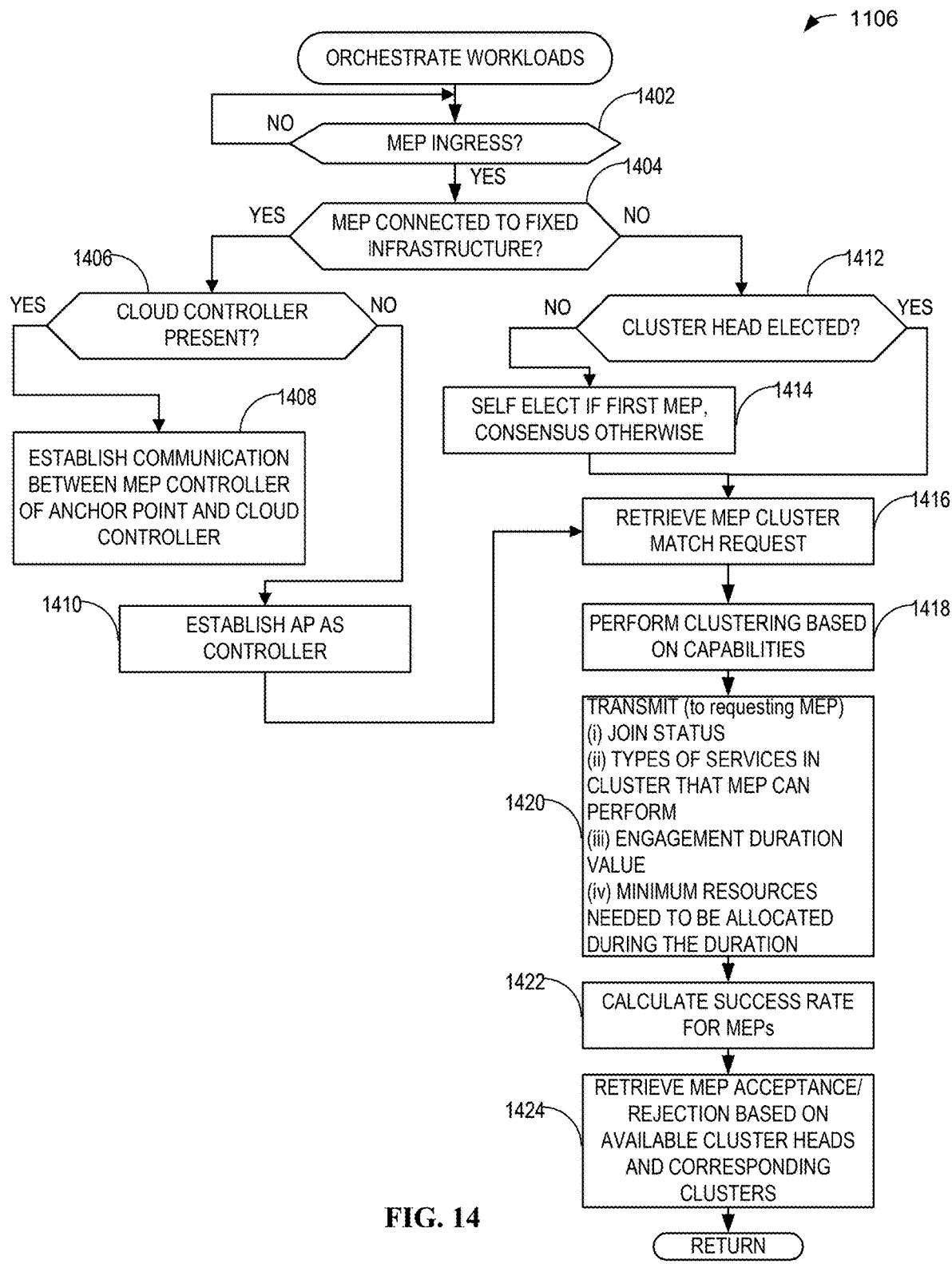

FIG. 14 illustrates additional detail corresponding to workload orchestration (block 1106) of FIG. 11. In the illustrated example of FIG. 13, the example node connection circuitry determines whether a candidate MEP is joining a workload effort (block 1402) and, if not, the occurrence of a join request is monitored. In response to detecting the join request (block 1402), the example capability validation circuitry 906 determines if the candidate MEP or the cluster of interest includes a fixed infrastructure (block 1404). If so, the example node connection circuitry 902 determines whether a cloud controller is present and/or otherwise communicatively connected (block 1406), as described above in connection with FIG. 10A. If a cloud controller is present, the example node connection circuitry 902 facilitates multi-tier control by establishing communication between a MEP controller in the anchor point and the detected cloud controller (block 1408). On the other hand, in the event the node connection circuitry 902 determines that a cloud controller is not present and/or communicatively connected to the AP (block 1406), then the example node connection circuitry establishes the AP as the controller (block 1410), as described above in connection with FIG. 10B.

Returning to block 1404, in the event the capability validation circuitry 906 determines that the MEP is not connected to and/or otherwise not capable of being connected to a fixed infrastructure, then the example cluster assignment circuitry 910 determines if a cluster head is available and/or previously elected for the cluster of interest (block 1412). If not, then the example cluster assignment circuitry 910 self elects the candidate MEP in the event it is the first MEP of the cluster (block 1414). On the other hand, if other MEPs are already part of the cluster of interest, the example cluster assignment circuitry 910 invokes a consensus algorithm to designate a cluster head (block 1414).

In either circumstance of a fixed architecture or not, the example node connection circuitry 902 retrieves a MEP cluster match request (block 1416). In some examples, the request includes telemetry data corresponding to particular MEP capabilities, and the example cluster assignment circuitry 910 performs clustering based on those capabilities (block 1418). As described above, clustering may be accomplished by way of a K-means algorithm. The example cluster assignment circuitry 910 transmits (e.g., to a candidate MEP that is requesting information to determine whether it is appropriate for the workload and/or cluster objectives) information to facilitate a score calculation indicative of the MEP's fit relative to other candidate MEPs to contribute to workload tasks (block 1420). In some examples, the cluster assignment circuitry transmits (i) a current join status (e.g., no current cluster membership, particular cluster membership), (ii) types of services in the cluster that the requesting MEP may be able to handle, (iii) an engagement duration value to identify and/or otherwise inform the MEP of its service obligations (if it should choose to accept), and (iv) a minimum type and/or quantity of resources needed to be allocated during the engagement duration (block 1420).

The cluster assignment circuitry 910 calculates a score (e.g., a success metric) for the candidate MEP (block 1422) and retrieves MEP acceptance or rejection based on the success rate (block 1424). In some examples, the decision to accept or reject participation with a workload or cluster is deferred until a threshold number of candidate MEPs are evaluated so that the score can be used to identify, in a relative manner, which candidate MEPs are most suitable for the tasks of interest corresponding to the workload and/or cluster objectives. Control then returns to block 1402 or, in some examples the program 1106 ends.

Figure 15:
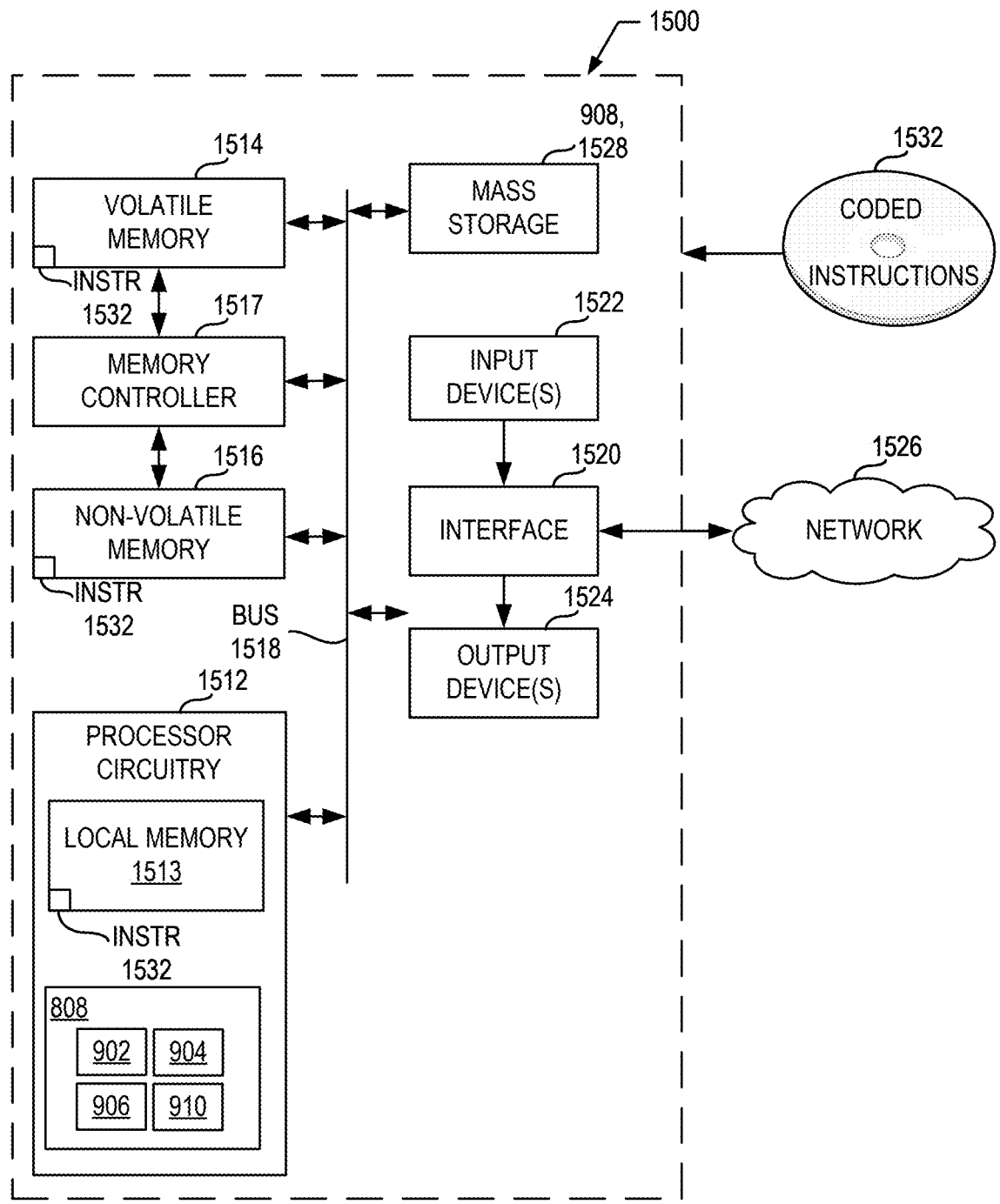
FIG. 15 is a block diagram of an example processing platform including processor circuitry structured to execute the example machine readable instructions of FIGS. 11-14 to implement the example MEP of FIGS. 8, 9, 10A and 10B to improve MEP resiliency.

FIG. 15 is a block diagram of an example processor platform 1500 structured to execute and/or instantiate the machine readable instructions and/or operations of FIGS. 11-14 to implement the MEPs 808, 810, 812 of FIGS. 8, 9, 10A and 10B. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a set top box, a headset (e.g., an augmented reality (AR) headset, a virtual reality (VR) headset, etc.) or other wearable device, or any other type of computing device.

The processor platform 1500 of the illustrated example includes processor circuitry 1512. The processor circuitry 1512 of the illustrated example is hardware. For example, the processor circuitry 1512 can be implemented by one or more integrated circuits, logic circuits, FPGAs microprocessors, CPUs, GPUs, DSPs, and/or microcontrollers from any desired family or manufacturer. The processor circuitry 1512 may be implemented by one or more semiconductor based (e.g., silicon based) devices. In this example, the processor circuitry 1512 implements the example node connection circuitry 902, the example authentication circuitry 904, the example capability validation circuitry 906, the example cluster assignment circuitry 910, and more generally, the example MEPs 808, 810, 812.

The processor circuitry 1512 of the illustrated example includes a local memory 1513 (e.g., a cache, registers, etc.). The processor circuitry 1512 of the illustrated example is in communication with a main memory including a volatile memory 1514 and a non-volatile memory 1516 by a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 1514, 1516 of the illustrated example is controlled by a memory controller 1517.

The processor platform 1500 of the illustrated example also includes interface circuitry 1520. The interface circuitry 1520 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1522 are connected to the interface circuitry 1520. The input device(s) 1522 permit(s) a user to enter data and/or commands into the processor circuitry 1512. The input device(s) 1522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1524 are also connected to the interface circuitry 1520 of the illustrated example. The output devices 1524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1500 of the illustrated example also includes one or more mass storage devices 1528 to store software and/or data. Examples of such mass storage devices 1528 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1532, which may be implemented by the machine readable instructions of FIGS. 11-13, may be stored in the mass storage device 1528, in the volatile memory 1514, in the non-volatile memory 1516, and/or on a removable non-transitory computer readable storage medium such as a CD or DVD.

Figure 16:
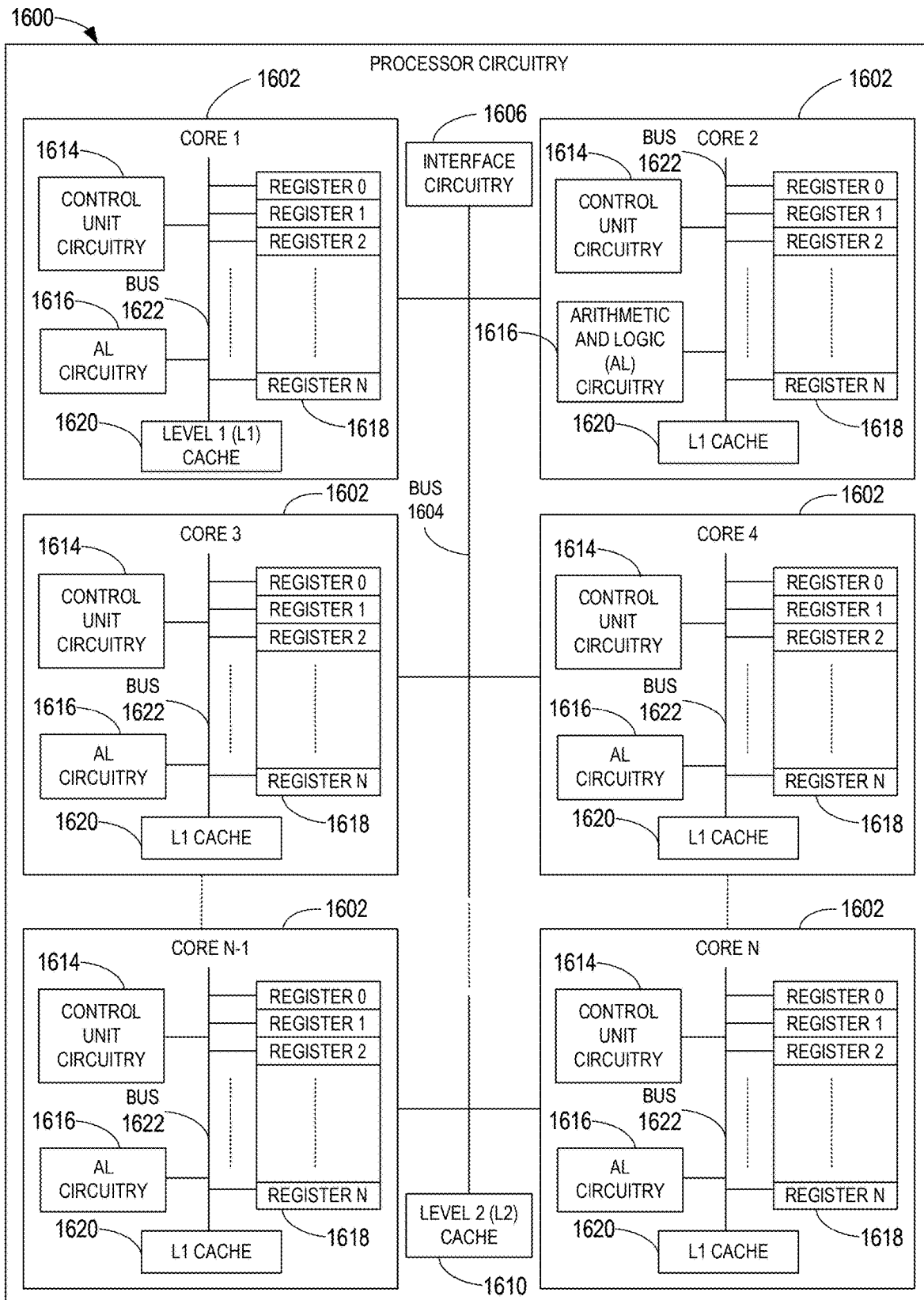
FIG. 16 is a block diagram of an example implementation of the processor circuitry of FIG. 15.

FIG. 16 is a block diagram of an example implementation of the processor circuitry 1512 of FIG. 15. In this example, the processor circuitry 1512 of FIG. 15 is implemented by a microprocessor 1600. For example, the microprocessor 1600 may implement multi-core hardware circuitry such as a CPU, a DSP, a GPU, an XPU, etc. Although it may include any number of example cores 902 (e.g., 1 core), the microprocessor 1600 of this example is a multi-core semiconductor device including N cores. The cores 1602 of the microprocessor 1600 may operate independently or may cooperate to execute machine readable instructions. For example, machine code corresponding to a firmware program, an embedded software program, or a software program may be executed by one of the cores 1602 or may be executed by multiple ones of the cores 1602 at the same or different times. In some examples, the machine code corresponding to the firmware program, the embedded software program, or the software program is split into threads and executed in parallel by two or more of the cores 1602. The software program may correspond to a portion or all of the machine readable instructions and/or operations represented by the flowcharts of FIGS. 11-14.

The cores 1602 may communicate by an example bus 1604. In some examples, the bus 1604 may implement a communication bus to effectuate communication associated with one(s) of the cores 1602. For example, the bus 1604 may implement at least one of an Inter-Integrated Circuit (I2C) bus, a Serial Peripheral Interface (SPI) bus, a PCI bus, or a PCIe bus. Additionally or alternatively, the bus 1604 may implement any other type of computing or electrical bus. The cores 1602 may obtain data, instructions, and/or signals from one or more external devices by example interface circuitry 1606. The cores 902 may output data, instructions, and/or signals to the one or more external devices by the interface circuitry 1606. Although the cores 1602 of this example include example local memory 1620 (e.g., Level 1 (L1) cache that may be split into an L1 data cache and an L1 instruction cache), the microprocessor 1600 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 1610. The local memory 1620 of each of the cores 1602 and the shared memory 1610 may be part of a hierarchy of storage devices including multiple levels of cache memory and the main memory (e.g., the main memory 1514, 1516 of FIG. 15). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1602 may be referred to as a CPU, DSP, GPU, etc., or any other type of hardware circuitry. Each core 1602 includes control unit circuitry 1614, arithmetic and logic (AL) circuitry (sometimes referred to as an ALU) 1616, a plurality of registers 1618, the L1 cache 1620, and an example bus 1622. Other structures may be present. For example, each core 1602 may include vector unit circuitry, single instruction multiple data (SIMD) unit circuitry, load/store unit (LSU) circuitry, branch/jump unit circuitry, floating-point unit (FPU) circuitry, etc. The control unit circuitry 1614 includes semiconductor-based circuits structured to control (e.g., coordinate) data movement within the corresponding core 1602. The AL circuitry 916 includes semiconductor-based circuits structured to perform one or more mathematic and/or logic operations on the data within the corresponding core 1602. The AL circuitry 1616 of some examples performs integer based operations. In other examples, the AL circuitry 1616 also performs floating point operations. In yet other examples, the AL circuitry 1616 may include first AL circuitry that performs integer based operations and second AL circuitry that performs floating point operations. In some examples, the AL circuitry 1616 may be referred to as an Arithmetic Logic Unit (ALU). The registers 1618 are semiconductor-based structures to store data and/or instructions such as results of one or more of the operations performed by the AL circuitry 1616 of the corresponding core 1602. For example, the registers 1618 may include vector register(s), SIMD register(s), general purpose register(s), flag register(s), segment register(s), machine specific register(s), instruction pointer register(s), control register(s), debug register(s), memory management register(s), machine check register(s), etc. The registers 1618 may be arranged in a bank as shown in FIG. 16. Alternatively, the registers 1618 may be organized in any other arrangement, format, or structure including distributed throughout the core 1602 to shorten access time. The bus 1620 may implement at least one of an I2C bus, a SPI bus, a PCI bus, or a PCIe bus Each core 1602 and/or, more generally, the microprocessor 1600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 17:
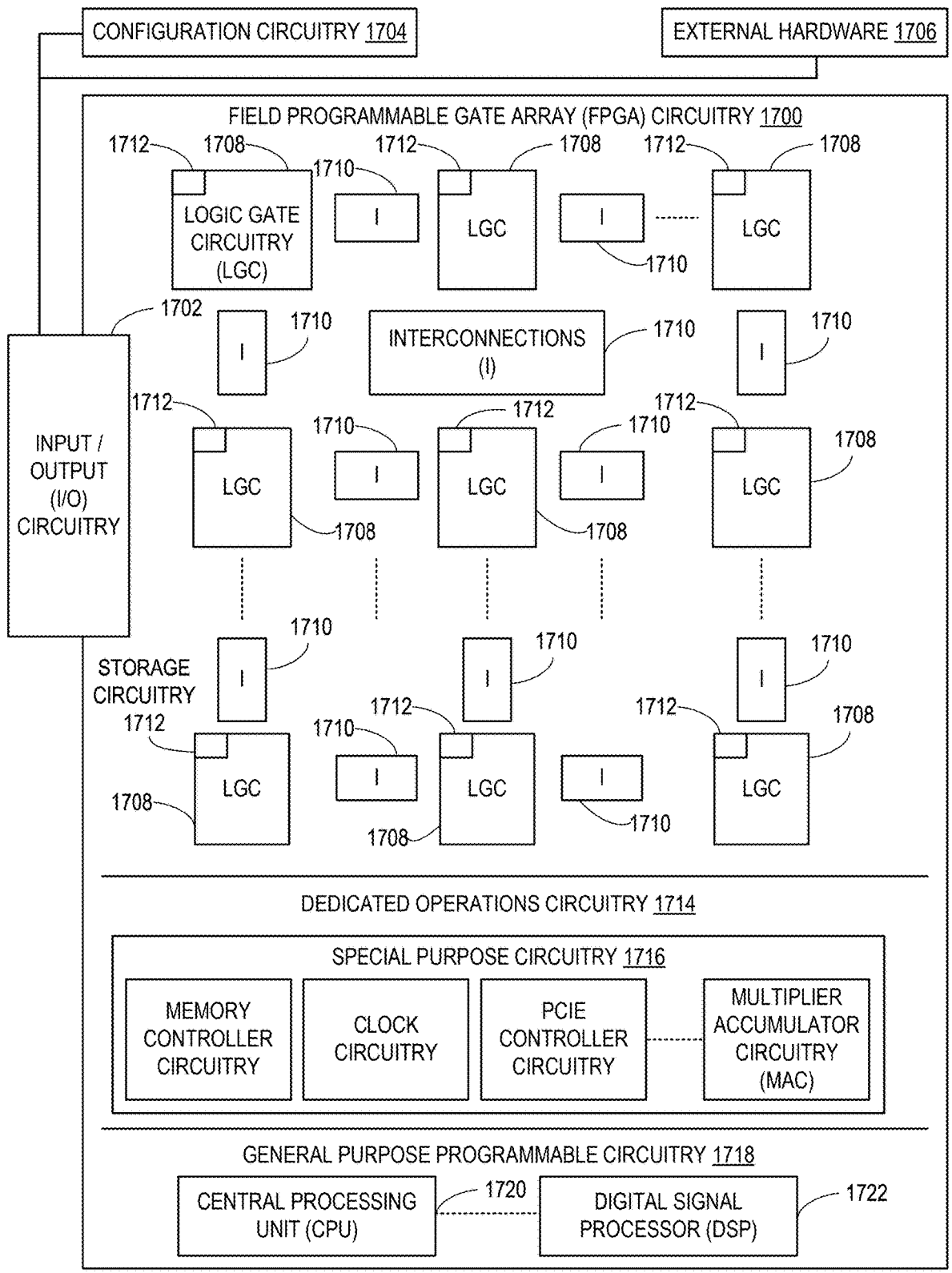
FIG. 17 is a block diagram of another example implementation of the processor circuitry of FIG. 15.

FIG. 17 is a block diagram of another example implementation of the processor circuitry 1512 of FIG. 15. In this example, the processor circuitry 1512 is implemented by FPGA circuitry 1700. The FPGA circuitry 1700 can be used, for example, to perform operations that could otherwise be performed by the example microprocessor 1600 of FIG. 16 executing corresponding machine readable instructions. However, once configured, the FPGA circuitry 1700 instantiates the machine readable instructions in hardware and, thus, can often execute the operations faster than they could be performed by a general purpose microprocessor executing the corresponding software.

More specifically, in contrast to the microprocessor 1600 of FIG. 16 described above (which is a general purpose device that may be programmed to execute some or all of the machine readable instructions represented by the flowcharts of FIGS. 11-14 but whose interconnections and logic circuitry are fixed once fabricated), the FPGA circuitry 1700 of the example of FIG. 17 includes interconnections and logic circuitry that may be configured and/or interconnected in different ways after fabrication to instantiate, for example, some or all of the machine readable instructions represented by the flowcharts of FIGS. 11-14. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 11-14. As such, the FPGA circuitry 1700 may be structured to effectively instantiate some or all of the machine readable instructions of the flowcharts of FIGS. 11-14 as dedicated logic circuits to perform the operations corresponding to those software instructions in a dedicated manner analogous to an ASIC. Therefore, the FPGA circuitry 1700 may perform the operations corresponding to the some or all of the machine readable instructions of FIGS. 11-14 faster than the general purpose microprocessor can execute the same.

In the example of FIG. 17, the FPGA circuitry 1700 is structured to be programmed (and/or reprogrammed one or more times) by an end user by a hardware description language (HDL) such as Verilog. The FPGA circuitry 1700 of FIG. 17, includes example input/output (I/O) circuitry 1702 to obtain and/or output data to/from example configuration circuitry 1704 and/or external hardware (e.g., external hardware circuitry) 1706. For example, the configuration circuitry 1704 may implement interface circuitry that may obtain machine readable instructions to configure the FPGA circuitry 1700, or portion(s) thereof. In some such examples, the configuration circuitry 1704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1706 may implement the microprocessor 1600 of FIG. 16. The FPGA circuitry 1700 also includes an array of example logic gate circuitry 1708, a plurality of example configurable interconnections 1710, and example storage circuitry 1712. The logic gate circuitry 1708 and interconnections 1710 are configurable to instantiate one or more operations that may correspond to at least some of the machine readable instructions of FIGS. 11-14 and/or other desired operations. The logic gate circuitry 1708 shown in FIG. 17 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1708 to enable configuration of the electrical structures and/or the logic gates to form circuits to perform desired operations. The logic gate circuitry 1708 may include other electrical structures such as look-up tables (LUTs), registers (e.g., flip-flops or latches), multiplexers, etc.

The interconnections 1710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1708 to program desired logic circuits.

The storage circuitry 1712 of the illustrated example is structured to store result(s) of the one or more of the operations performed by corresponding logic gates. The storage circuitry 1712 may be implemented by registers or the like. In the illustrated example, the storage circuitry 1012 is distributed amongst the logic gate circuitry 1708 to facilitate access and increase execution speed.

The example FPGA circuitry 1700 of FIG. 17 also includes example Dedicated Operations Circuitry 1714. In this example, the Dedicated Operations Circuitry 1714 includes special purpose circuitry 1016 that may be invoked to implement commonly used functions to avoid the need to program those functions in the field. Examples of such special purpose circuitry 1716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1700 may also include example general purpose programmable circuitry 1718 such as an example CPU 1720 and/or an example DSP 1722. Other general purpose programmable circuitry 1718 may additionally or alternatively be present such as a GPU, an XPU, etc., that can be programmed to perform other operations.

Although FIGS. 16 and 17 illustrate two example implementations of the processor circuitry 1512 of FIG. 15, many other approaches are contemplated. For example, as mentioned above, modern FPGA circuitry may include an on-board CPU, such as one or more of the example CPU 1720 of FIG. 17. Therefore, the processor circuitry 1512 of FIG. 15 may additionally be implemented by combining the example microprocessor 1600 of FIG. 16 and the example FPGA circuitry 1700 of FIG. 17. In some such hybrid examples, a first portion of the machine readable instructions represented by the flowcharts of FIGS. 11-14 may be executed by one or more of the cores 1602 of FIG. 16 and a second portion of the machine readable instructions represented by the flowcharts of FIGS. 11-14 may be executed by the FPGA circuitry 1700 of FIG. 17.

In some examples, the processor circuitry 1512 of FIG. 15 may be in one or more packages. For example, the processor circuitry 1600 of FIG. 16 and/or the FPGA circuitry 1700 of FIG. 17 may be in one or more packages. In some examples, an XPU may be implemented by the processor circuitry 1512 of FIG. 15, which may be in one or more packages. For example, the XPU may include a CPU in one package, a DSP in another package, a GPU in yet another package, and an FPGA in still yet another package.

Figure 18:
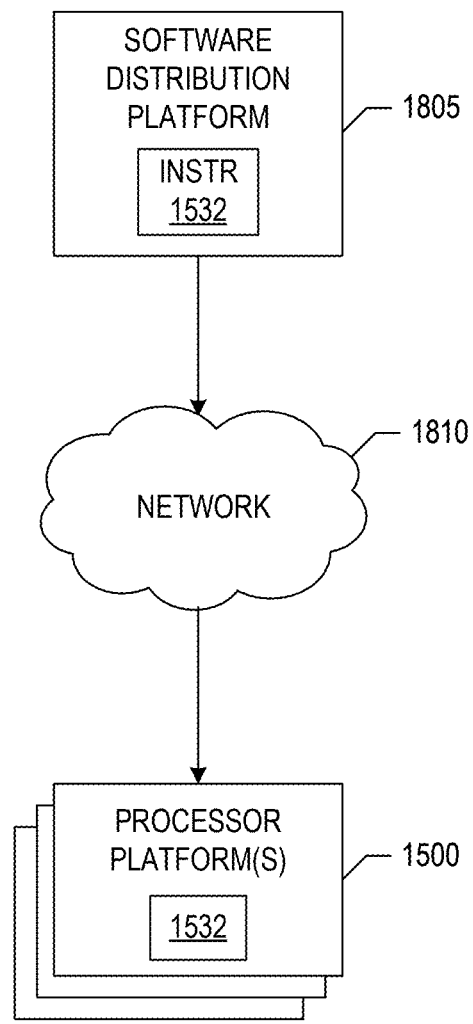
FIG. 18 is a block diagram of an example software distribution platform (e.g., one or more servers) to distribute software (e.g., software corresponding to the example machine readable instructions of FIGS. 11-14) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1805 to distribute software such as the example machine readable instructions 1532 of FIG. 15 to hardware devices owned and/or operated by third parties is illustrated in FIG. 18. The example software distribution platform 1805 may be implemented by any computer server, data facility, cloud service, etc., capable of storing and transmitting software to other computing devices. The third parties may be customers of the entity owning and/or operating the software distribution platform 1805. For example, the entity that owns and/or operates the software distribution platform 1805 may be a developer, a seller, and/or a licensor of software such as the example machine readable instructions 1532 of FIG. 15. The third parties may be consumers, users, retailers, OEMs, etc., who purchase and/or license the software for use and/or re-sale and/or sub-licensing. In the illustrated example, the software distribution platform 1805 includes one or more servers and one or more storage devices. The storage devices store the machine readable instructions 1532, which may correspond to the example machine readable instructions of FIGS. 11-14, as described above. The one or more servers of the example software distribution platform 1105 are in communication with a network 1810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1532 from the software distribution platform 1805. For example, the software, which may correspond to the example machine readable instructions of FIGS. 11-14, may be downloaded to the example processor platform 1500, which is to execute the machine readable instructions 1532 to implement the operations of FIGS. 11-14. In some examples, one or more servers of the software distribution platform 1805 periodically offer, transmit, and/or force updates to the software (e.g., the example machine readable instructions 1532 of FIG. 15) to ensure improvements, patches, updates, etc., are distributed and applied to the software at the end user devices.

From the foregoing, it will be appreciated that example systems, methods, apparatus, and articles of manufacture have been disclosed that enable networks to dynamically respond to failures when traditional communicative redundancies cannot rely on alternate connectivity to a fixed network. Examples disclosed herein enable network capabilities to continue in response to one or more failures within the network, such as equipment failures, natural disasters, and/or other network anomalies that adversely affect network bandwidth, and/or network latency. Examples disclosed herein facilitate deployment of ad hoc networks in a manner that promotes resiliency, such as launching networks and/or network resources having authentication safeguards and reduced reliance on traditional permanent infrastructure connectivity.

Example methods, apparatus, systems, and articles of manufacture to improve mobile edge platform resiliency are disclosed herein. Further examples and combinations thereof include the following:

Example 1 includes an apparatus to deploy mobile edge platforms comprising memory, instructions, and processor circuitry to execute the instructions to initiate a search for one of an access point or a cluster head at a first time, in response to detection of the cluster head, initiate an intra-cluster mobile edge platform (MEP) mutual authentication associated with the cluster head, cause transmission of historical activity data to at least one MEP associated with the cluster head, and cause storage of an authentication metric in a secure storage, the authentication metric based on historical connectivity data.

Example 2 includes the apparatus as defined in example 1, wherein the processor circuitry is to cause storage of the authentication metric in a blockchain corresponding to the secure storage.

Example 3 includes the apparatus as defined in example 1, wherein the processor circuitry is to cause storage of an on-demand identity assigned by the cluster head.

Example 4 includes the apparatus as defined in example 3, wherein the processor circuitry is to generate a capability list corresponding to on board resources, and cause storage of the capability list in the secure storage.

Example 5 includes the apparatus as defined in example 4, wherein the processor circuitry is to solicit cluster membership by causing transmission of the on-demand ID to the cluster head, and causing transmission of the capability list to the cluster head.

Example 6 includes the apparatus as defined in example 5, wherein the processor circuitry is to initiate a timer corresponding to a cluster membership duration assigned by the cluster head.

Example 7 includes the apparatus as defined in example 6, wherein the processor circuitry is to disband membership from the cluster when the cluster membership duration is satisfied.

Example 8 includes the apparatus as defined in example 6, wherein the processor circuitry is to re-initiate cluster membership solicitation when the cluster membership duration is satisfied.

Example 9 includes the apparatus as defined in example 6, wherein the processor circuitry is to re-initiate cluster membership solicitation in response to satisfaction of security conditions is detected.

Example 10 includes the apparatus as defined in example 1, wherein the historical activity data includes at least one of a communication connection type or a connection success rate.

Example 11 includes the apparatus as defined in example 10, wherein the communication connection type includes at least one of cellular radio, WiFi or Bluetooth.

Example 12 includes the apparatus as defined in example 1, wherein the processor circuitry is to initiate a search for the access point at a second time, in response to detection of the access point, initiate authentication with the access point, and transmit a network maintenance request.

Example 13 includes the apparatus as defined in example 1, wherein detecting the cluster head instead of the access point is indicative of a network anomaly.

Example 14 includes an apparatus to improve mobile edge platform resiliency, the apparatus comprising interface circuitry to access a first request to execute a service, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate node connection circuitry to identify at least one of an access point or a cluster head during a first authentication attempt, and authentication circuitry to perform an intra-cluster mobile edge platform (MEP) mutual authentication with the cluster head, the node connection circuitry to (a) cause transmission of historical activity data to at least one MEP corresponding to the cluster head and (b) cause storage of an authentication metric in a secure storage, the authentication metric based on processing of the historical connectivity data.

Example 15 includes the apparatus as defined in example 14, wherein the processor circuitry is to instantiate cluster assignation circuitry to cause storage of the authentication metric in a blockchain corresponding to the secure storage.

Example 16 includes the apparatus as defined in example 14, wherein the node connection circuitry is to cause storage of an on-demand identity assigned by the cluster head.

Example 17 includes the apparatus as defined in example 16, wherein the processor circuitry is to instantiate capability validation circuitry to generate a capability list corresponding to on board resources, and cause storage of the capability list in the secure storage.

Example 18 includes the apparatus as defined in example 17, wherein the node connection circuitry is to cause transmission of the on-demand ID to the cluster head, and cause transmission of the capability list to the cluster head.

Example 19 includes the apparatus as defined in example 18, wherein the processor circuitry is to instantiate cluster assignation circuitry to initiate a timer corresponding to a cluster membership duration assigned by the cluster head.

Example 20 includes the apparatus as defined in example 19, wherein the cluster assignation circuitry is to disband membership from the cluster when the cluster membership duration is satisfied.

Example 21 includes the apparatus as defined in example 19, wherein the cluster assignation circuitry is to re-initiate cluster membership solicitation when the cluster membership duration is satisfied.

Example 22 includes the apparatus as defined in example 19, wherein the cluster assignation circuitry is to re-initiate cluster membership solicitation in response to satisfaction of security conditions is detected.

Example 23 includes the apparatus as defined in example 14, wherein the historical activity data includes at least one of a communication connection type or a connection success rate.

Example 24 includes the apparatus as defined in example 23, wherein the communication connection type includes at least one of cellular radio, WiFi or Bluetooth.

Example 25 includes the apparatus as defined in example 14, wherein the node connection circuitry is to initiate a search for the access point at a second time, the authentication circuitry to, in response to detection of the access point, initiate authentication with the access point and transmit a network maintenance request.

Example 26 includes the apparatus as defined in example 14, wherein the node connection circuitry is to identify a network anomaly when the cluster head is detected instead of the access point.

Example 27 includes at least one non-transitory computer readable storage medium comprising instructions that, when executed, cause at least one processor to at least locate one of an access point or a cluster head at a first time, in response to locating the cluster head, initiating an intra-cluster mobile edge platform (MEP) mutual authentication associated with the cluster head, cause transmission of historical activity data to at least one MEP associated with the cluster head, and cause storage of an authentication metric in a secure storage, the authentication metric based on processing of the historical connectivity data by the at least one MEP.

Example 28 includes the at least one computer readable storage medium as defined in example 27, wherein the instructions, when executed, cause the at least one processor to cause storage of the authentication metric in a blockchain corresponding to the secure storage.

Example 29 includes the at least one computer readable storage medium as defined in example 27, wherein the instructions, when executed, cause the at least one processor to cause storage of an on-demand identity assigned by the cluster head.

Example 30 includes the at least one computer readable storage medium as defined in example 29, wherein the instructions, when executed, cause the at least one processor to generate a capability list corresponding to on board resources, and cause storage of the capability list in the secure storage.

Example 31 includes the at least one computer readable storage medium as defined in example 30, wherein the instructions, when executed, cause the at least one processor to solicit cluster membership by causing transmission of the on-demand ID to the cluster head, and causing transmission of the capability list to the cluster head.

Example 32 includes the at least one computer readable storage medium as defined in example 31, wherein the instructions, when executed, cause the at least one processor to initiate a timer corresponding to a cluster membership duration assigned by the cluster head.

Example 33 includes the at least one computer readable storage medium as defined in example 32, wherein the instructions, when executed, cause the at least one processor to disband membership from the cluster when the cluster membership duration is satisfied.

Example 34 includes the at least one computer readable storage medium as defined in example 32, wherein the instructions, when executed, cause the at least one processor to re-initiate cluster membership solicitation when the cluster membership duration is satisfied.

Example 35 includes the at least one computer readable storage medium as defined in example 32, wherein the instructions, when executed, cause the at least one processor to re-initiate cluster membership solicitation in response to satisfaction of security conditions is detected.

Example 36 includes the at least one computer readable storage medium as defined in example 27, wherein the instructions, when executed, cause the at least one processor to identify the historical activity data as at least one of a communication connection type or a connection success rate.

Example 37 includes the at least one computer readable storage medium as defined in example 36, wherein the instructions, when executed, cause the at least one processor to identify the communication connection type as at least one of cellular radio, WiFi or Bluetooth.

Example 38 includes the at least one computer readable storage medium as defined in example 27, wherein the instructions, when executed, cause the at least one processor to initiate a search for the access point at a second time, in response to detection of the access point, initiate authentication with the access point, and transmit a network maintenance request.

Example 39 includes the at least one computer readable storage medium as defined in example 27, wherein the instructions, when executed, cause the at least one processor to identify a network anomaly condition when the cluster head is detected instead of the access point.

Example 40 includes an apparatus to facilitate mobile edge platform resiliency comprising means for connecting nodes to identify at least one of an access point or a cluster head at a first time, and means for authenticating to perform an intra-cluster mobile edge platform (MEP) mutual authentication with the cluster head, the means for connecting nodes to (a) cause transmission of historical activity data to at least one MEP corresponding to the cluster head, and (b) cause storage of an authentication metric in a secure storage, the authentication metric based on processing of the historical connectivity data.

Example 41 includes the apparatus as defined in example 40, further including means for assigning to cause storage of the authentication metric in a blockchain corresponding to the secure storage.

Example 42 includes the apparatus as defined in example 40, wherein the means for connecting nodes is to cause storage of an on-demand identity assigned by the cluster head.

Example 43 includes the apparatus as defined in example 42, further including means for validating capabilities to generate a capability list corresponding to on board resources, and cause storage of the capability list in the secure storage.

Example 44 includes the apparatus as defined in example 43, wherein the means for connecting nodes is to cause transmission of the on-demand ID to the cluster head, and cause transmission of the capability list to the cluster head.

Example 45 includes the apparatus as defined in example 44, further including means for assigning to initiate a timer corresponding to a cluster membership duration assigned by the cluster head.

Example 46 includes the apparatus as defined in example 45, wherein the means for assigning is to disband membership from the cluster when the cluster membership duration is satisfied.

Example 47 includes the apparatus as defined in example 45, wherein the means for assigning is to re-initiate cluster membership solicitation when the cluster membership duration is satisfied.

Example 48 includes the apparatus as defined in example 45, wherein the means for assigning is to re-initiate cluster membership solicitation in response to satisfaction of security conditions is detected.

Example 49 includes the apparatus as defined in example 40, wherein the historical activity data includes at least one of a communication connection type or a connection success rate.

Example 50 includes the apparatus as defined in example 49, wherein the communication connection type includes at least one of cellular radio, WiFi or Bluetooth.

Example 51 includes the apparatus as defined in example 40, wherein the means for connecting is to initiate a search for the access point at a second time, the means for authenticating to, in response to detection of the access point, initiate authentication with the access point and transmit a network maintenance request.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   machine-readable instructions; and
   at least one processor circuit to be programmed by the machine-readable instructions to:
      identify a cluster head during an authentication attempt; and
      perform an intra-cluster mobile edge platform (MEP) mutual authentication with the cluster head by (a) causing transmission of historical connectivity data to at least one MEP corresponding to the cluster head and (b) causing storage of an authentication metric in a secure storage, the authentication metric based on the historical connectivity data satisfying a threshold connection success rate.

2. The apparatus as defined in claim 1, wherein one or more of the at least one processor circuit is to cause storage of an on-demand identity (ID) assigned by the cluster head.

3. The apparatus as defined in claim 2, wherein one or more of the at least one processor circuit is to:
   generate a capability list corresponding to on board resources; and
   cause storage of the capability list in the secure storage.

4. The apparatus as defined in claim 3, wherein one or more of the at least one processor circuit is to:

cause transmission of the on-demand ID to the cluster head; and
cause transmission of the capability list to the cluster head.

5. The apparatus as defined in claim 1, wherein one or more of the at least one processor circuit is to initiate a timer corresponding to a cluster membership duration assigned by the cluster head.

6. The apparatus as defined in claim 5, wherein one or more of the at least one processor circuit is to disband membership from the cluster head when the cluster membership duration is satisfied.

7. The apparatus as defined in claim 5, wherein one or more of the at least one processor circuit is to re-initiate cluster membership solicitation when the cluster membership duration is satisfied.

8. The apparatus as defined in claim 5, wherein one or more of the at least one processor circuit is to re-initiate cluster membership solicitation in response to detection of satisfaction of security conditions.

9. The apparatus as defined in claim 1, wherein one or more of the at least one processor circuit is to:
initiate a search for an access point at a second time; and
initiate authentication with the access point and transmit a network maintenance request.

10. The apparatus as defined in claim 1, wherein one or more of the at least one processor circuit is to identify a network anomaly when the cluster head is detected instead of an access point.

11. At least one non-transitory machine-readable medium comprising machine-readable instructions to cause at least one processor circuit to at least:
locate a cluster head at a first time;
after locating the cluster head, initiating an intra-cluster mobile edge platform (MEP) mutual authentication with the cluster head;
cause transmission of historical connectivity data to at least one MEP associated with the cluster head; and
cause storage of an authentication metric in a secure storage, the authentication metric based on the historical connectivity data satisfying a threshold connection success rate.

12. The at least one computer non-transitory machine-readable medium as defined in claim 11, wherein the machine-readable instructions, are to cause one or more of the at least one processor circuit to cause storage of the authentication metric in a blockchain corresponding to the secure storage.

13. The at least one non-transitory machine-readable medium as defined in claim 11, wherein the machine-readable instructions are to cause one or more of the at least one processor circuit to cause storage of an on-demand identity (ID) assigned by the cluster head.

14. The at least one non-transitory machine-readable medium as defined in claim 13, wherein the machine-readable instructions are to cause one or more of the at least one processor circuit to:
generate a capability list corresponding to on board resources; and
cause storage of the capability list in the secure storage.

15. The at least one non-transitory machine-readable medium as defined in claim 14, wherein the machine-readable instructions are to cause one or more of the at least one processor circuit to solicit cluster membership by:
causing transmission of the on-demand ID to the cluster head; and
causing transmission of the capability list to the cluster head.

16. The at least one non-transitory machine-readable medium as defined in claim 11, wherein the machine-readable instructions are to cause one or more of the at least one processor circuit to initiate a timer corresponding to a cluster membership duration assigned by the cluster head.

17. The at least one non-transitory machine-readable medium as defined in claim 16, wherein the machine-readable instructions are to cause one or more of the at least one processor circuit to disband membership from the cluster when the cluster membership duration is satisfied.

18. The at least one non-transitory machine-readable medium as defined in claim 16, wherein the machine-readable instructions are to cause one or more of the at least one processor circuit to re-initiate cluster membership solicitation in response to satisfaction of security conditions is detected.

19. The at least one non-transitory machine-readable medium as defined in claim 11, wherein the machine-readable instructions are to cause one or more of the at least one processor circuit to identify the historical activity data as a communication connection type.

20. The at least one non-transitory machine-readable medium as defined in claim 11, wherein the machine-readable instructions are to cause one or more of the at least one processor circuit to:
initiate a search for an access point at a second time;
in response to detection of the access point, initiate authentication with the access point; and
transmit a network maintenance request.

21. The at least one non-transitory machine-readable medium as defined in claim 11, wherein the machine-readable instructions are to cause one or more of the at least one processor circuit to identify a network anomaly condition when the cluster head is detected instead of an access point.

22. An apparatus to facilitate mobile edge platform resiliency comprising:
means for connecting nodes to identify a cluster head at a first time; and
means for authenticating to perform an intra-cluster mobile edge platform (MEP) mutual authentication with the cluster head, the means for connecting nodes to:
(a) cause transmission of historical connectivity data to at least one MEP corresponding to the cluster head; and
(b) cause storage of an authentication metric in a secure storage, the authentication metric based on the historical connectivity data satisfying a threshold connection success rate.

23. The apparatus as defined in claim 22, wherein the means for connecting nodes is to cause storage of an on-demand identity (ID) assigned by the cluster head.

24. The apparatus as defined in claim 23, further including means for validating capabilities to:
generate a capability list corresponding to on board resources; and
cause storage of the capability list in the secure storage.

25. The apparatus as defined in claim 24, wherein the means for connecting nodes is to:
cause transmission of the on-demand ID to the cluster head; and
cause transmission of the capability list to the cluster head.

26. The apparatus as defined in claim 22, including means for assigning to initiate a timer corresponding to a cluster membership duration assigned by the cluster head.

27. The apparatus as defined in claim 22, wherein the means for connecting is to initiate a search for an access point at a second time, the means for authenticating to, in response to detection of the access point, initiate authentication with the access point and transmit a network maintenance request.

* * * * *